US008549650B2

(12) United States Patent
Hanson

(10) Patent No.: US 8,549,650 B2
(45) Date of Patent: Oct. 1, 2013

(54) SYSTEM AND METHOD FOR THREE-DIMENSIONAL VISUALIZATION OF VULNERABILITY AND ASSET DATA

(75) Inventor: Jim Hanson, Ellicott City, MD (US)

(73) Assignee: Tenable Network Security, Inc., Columbia, MD (US)

( * ) Notice: Subject to any disclaimer, the term of this patent is extended or adjusted under 35 U.S.C. 154(b) by 269 days.

(21) Appl. No.: 12/775,120

(22) Filed: May 6, 2010

(65) Prior Publication Data

US 2011/0277034 A1    Nov. 10, 2011

(51) Int. Cl.
*H04L 29/06* (2006.01)

(52) U.S. Cl.
USPC ............... 726/25; 726/3; 726/23; 713/166

(58) Field of Classification Search
USPC .................................................. 726/23, 25
See application file for complete search history.

(56) References Cited

U.S. PATENT DOCUMENTS

| 4,525,599 | A | 6/1985 | Curran et al. ............... 178/22.08 |
|---|---|---|---|
| 5,541,997 | A | 7/1996 | Pappas et al. ..................... 380/49 |
| 5,572,729 | A | 11/1996 | Giordano et al. .............. 395/616 |
| 5,715,391 | A | 2/1998 | Jackson et al. ........... 395/200.01 |
| 5,721,819 | A | 2/1998 | Galles et al. ............. 395/200.15 |
| 5,838,919 | A | 11/1998 | Schwaller et al. ........ 395/200.54 |
| 5,844,817 | A | 12/1998 | Lobley et al. .................. 364/578 |
| 6,154,775 | A | 11/2000 | Coss et al. ..................... 709/225 |
| 6,266,774 | B1 * | 7/2001 | Sampath et al. ................ 726/24 |
| 6,269,447 | B1 * | 7/2001 | Maloney et al. ................ 726/25 |
| 6,324,656 | B1 | 11/2001 | Gleichauf et al. .............. 714/37 |
| 6,393,568 | B1 | 5/2002 | Ranger et al. ................. 713/188 |
| 6,415,321 | B1 | 7/2002 | Gleichauf et al. ............ 709/224 |
| 6,487,666 | B1 | 11/2002 | Shanklin et al. ............... 713/201 |
| 6,499,107 | B1 | 12/2002 | Gleichauf et al. ............. 713/201 |
| 6,510,509 | B1 | 1/2003 | Chopra et al. ................... 712/13 |
| 6,606,663 | B1 | 8/2003 | Liao et al. ...................... 709/229 |
| 6,704,874 | B1 | 3/2004 | Porras et al. ................... 713/201 |
| 6,711,127 | B1 | 3/2004 | Gorman et al. ................ 370/230 |
| 6,789,202 | B1 | 9/2004 | Ko et al. ........................ 713/201 |
| 6,847,982 | B2 | 1/2005 | Parker et al. ................... 707/200 |
| 6,873,617 | B1 | 3/2005 | Karras .......................... 370/389 |
| 6,882,728 | B1 | 4/2005 | Takahashi et al. ............. 380/201 |
| 6,886,020 | B1 | 4/2005 | Zahavi et al. .................. 707/204 |
| 6,952,779 | B1 | 10/2005 | Cohen et al. ................... 713/200 |

(Continued)

OTHER PUBLICATIONS

"Exploring Three-dimensional Visualization for Intrusion Detection"; Adam Oline, Dirk Reiners; Workshop on Visualization for Computer Security, Oct. 26, 2005; IEEE.*

(Continued)

*Primary Examiner* — Mohammad L Rahman
(74) *Attorney, Agent, or Firm* — Pillsbury Winthrop Shaw Pittman LLP

(57) ABSTRACT

The system and method for three-dimensional visualization of vulnerability and asset data described herein may provide a management console that integrates various active vulnerability scanners, various passive vulnerability scanners, and a log correlation engine distributed in a network. In particular, the management console may include a three-dimensional visualization tool that can be used to generate three-dimensional visualizations that graphically represent vulnerabilities and assets in the network from the integrated information that management console collects the active vulnerability scanners, the passive vulnerability scanners, and the log correlation engine distributed in the network. As such, the three-dimensional visualization tool may generate three-dimensional representations of the vulnerabilities and assets in the network that can be used to substantially simplify management of the network.

25 Claims, 9 Drawing Sheets

(56) References Cited

U.S. PATENT DOCUMENTS

| | | | |
|---|---|---|---|
| 6,957,348 B1 | 10/2005 | Flowers et al. | 713/201 |
| 6,968,377 B1 | 11/2005 | Gleichauf et al. | 709/224 |
| 7,017,186 B2 | 3/2006 | Day | 726/23 |
| 7,073,198 B1 | 7/2006 | Flowers et al. | 726/25 |
| 7,093,287 B1 | 8/2006 | Gusler et al. | 726/13 |
| 7,120,148 B1 | 10/2006 | Batz et al. | 370/392 |
| 7,134,141 B2 | 11/2006 | Crosbie et al. | 726/23 |
| 7,139,819 B1 | 11/2006 | Luo et al. | 709/223 |
| 7,152,105 B2* | 12/2006 | McClure et al. | 709/224 |
| 7,162,742 B1 | 1/2007 | Flowers et al. | 726/25 |
| 7,181,769 B1 | 2/2007 | Keanini et al. | 726/23 |
| 7,237,264 B1 | 6/2007 | Graham et al. | 726/23 |
| 7,243,366 B2 | 7/2007 | Medvinsky et al. | 726/2 |
| 7,272,646 B2 | 9/2007 | Cooper et al. | 709/223 |
| 7,290,145 B2 | 10/2007 | Falkenthros | 713/182 |
| 7,310,687 B2 | 12/2007 | Psounis et al. | 709/247 |
| 7,324,551 B1 | 1/2008 | Stammers | 370/468 |
| 7,509,681 B2 | 3/2009 | Flowers et al. | 726/25 |
| 7,594,273 B2 | 9/2009 | Keanini et al. | 726/25 |
| 7,653,647 B2 | 1/2010 | Borthakur et al. | 707/102 |
| 7,661,134 B2 | 2/2010 | Radatti | 726/22 |
| 7,735,100 B1 | 6/2010 | Sallam | 719/330 |
| 7,739,377 B2 | 6/2010 | Benedetti et al. | 709/224 |
| 7,761,918 B2 | 7/2010 | Gula et al. | 726/23 |
| 7,904,479 B2 | 3/2011 | Zuk | 707/791 |
| 7,908,254 B2 | 3/2011 | Suermondt et al. | 707/698 |
| 7,926,113 B1 | 4/2011 | Gula et al. | 726/25 |
| 7,966,358 B2 | 6/2011 | Deolalikar et al. | 708/250 |
| 8,135,815 B2* | 3/2012 | Mayer | 709/223 |
| 8,302,198 B2 | 10/2012 | Deraison | 726/25 |
| 2001/0034847 A1 | 10/2001 | Gaul, Jr. | 713/201 |
| 2002/0019945 A1 | 2/2002 | Houston et al. | 713/201 |
| 2002/0093527 A1 | 7/2002 | Sherlock et al. | 345/736 |
| 2002/0100023 A1 | 7/2002 | Ueki et al. | 717/127 |
| 2002/0107841 A1 | 8/2002 | Hellerstein et al. | 707/3 |
| 2002/0166063 A1 | 11/2002 | Lachman, III et al. | 713/200 |
| 2003/0051026 A1 | 3/2003 | Carter et al. | 709/224 |
| 2003/0056116 A1* | 3/2003 | Bunker et al. | 713/201 |
| 2003/0135517 A1 | 7/2003 | Kauffman | 707/103 R |
| 2003/0145225 A1 | 7/2003 | Bruton, III et al. | 713/201 |
| 2003/0196123 A1 | 10/2003 | Rowland et al. | 713/201 |
| 2004/0003266 A1 | 1/2004 | Moshir et al. | 713/191 |
| 2004/0015719 A1 | 1/2004 | Lee et al. | 713/201 |
| 2004/0034795 A1* | 2/2004 | Anderson et al. | 713/201 |
| 2004/0042470 A1 | 3/2004 | Cooper et al. | 370/401 |
| 2004/0193918 A1 | 9/2004 | Green et al. | 713/201 |
| 2005/0068928 A1 | 3/2005 | Smith et al. | 370/338 |
| 2005/0108578 A1 | 5/2005 | Tajalli et al. | 713/201 |
| 2005/0128988 A1 | 6/2005 | Simpson et al. | 370/338 |
| 2005/0188419 A1 | 8/2005 | Dadhia et al. | 726/1 |
| 2005/0203886 A1 | 9/2005 | Wong | 707/3 |
| 2005/0203921 A1 | 9/2005 | Newman et al. | 707/100 |
| 2005/0229255 A1* | 10/2005 | Gula et al. | 726/23 |
| 2006/0010245 A1 | 1/2006 | Carnahan | 709/231 |
| 2006/0018466 A1 | 1/2006 | Adelstein et al. | 380/46 |
| 2006/0117091 A1 | 6/2006 | Justin | 709/217 |
| 2006/0184682 A1 | 8/2006 | Suchowski et al. | 709/229 |
| 2007/0028304 A1 | 2/2007 | Brennan | 726/24 |
| 2007/0169190 A1 | 7/2007 | Kolton et al. | 726/22 |
| 2007/0271598 A1 | 11/2007 | Chen et al. | 726/4 |
| 2007/0277238 A1 | 11/2007 | Margalit et al. | 726/22 |
| 2008/0022400 A1 | 1/2008 | Cohen et al. | 726/22 |
| 2008/0047009 A1 | 2/2008 | Overcash et al. | 726/23 |
| 2008/0072285 A1 | 3/2008 | Sankaran et al. | 726/2 |
| 2009/0013141 A1 | 1/2009 | Kinoshita | 711/163 |
| 2009/0049016 A1 | 2/2009 | Sakamoto | 707/3 |
| 2009/0138945 A1 | 5/2009 | Savchuk | 726/4 |
| 2009/0177782 A1 | 7/2009 | Blatherwick et al. | 709/228 |
| 2010/0030780 A1 | 2/2010 | Eshghi et al. | 707/6 |
| 2010/0043066 A1 | 2/2010 | Miliefsky | 726/9 |
| 2010/0114842 A1 | 5/2010 | Forman et al. | 707/692 |
| 2010/0281539 A1 | 11/2010 | Burns et al. | 726/23 |
| 2011/0185055 A1 | 7/2011 | Nappier et al. | 709/224 |
| 2011/0185431 A1 | 7/2011 | Deraison | 726/25 |
| 2011/0231935 A1 | 9/2011 | Gula et al. | 726/25 |
| 2011/0314245 A1 | 12/2011 | Hanes et al. | 711/164 |

OTHER PUBLICATIONS

"Present your data in a column chart", Microsoft, 2007.*

Kim et al., "Real-Time Visualization of Network Attacks on High-Speed Links", IEEE, 2004.*

Huang et al., "Research of Security Metric Architecture for Next Generation Network", IEEE, 2009.*

Wack, John, et al., NIST Special Publication 800-42, "Guideline on Network Security Testing", Computer Security Division, National Institute of Standards and Technology, Oct. 2003, pp. 1-92.

Deraison, Renaud, et al., "Passive Vulnerability Scanning Introduction to NeVo", Revision 9, Tenable Network Security, Aug. 2003, pp. 1-13.

Deraison, Renaud, et al., "Unified Security Monitoring (USM); Real-Time Situational Awareness of Network Vulnerabilities, Events and Configurations", Revision 2, Tenable Network Security, Jan. 27, 2009, 12 pages.

Zhang, Yin, et al., "Detecting Backdoors", *Proceedings of the 9th USENIX Security Symposium*, Denver, Colorado, Aug. 2000, 11 pages.

"Basic Cryptanalysis", Department of the Army, Field Manual No. 34-40-2, Sep. 13, 1990, 363 pages.

Kim, Gene H., et al., "The Design and Implementation of Tripwire: A File System Integrity Checker", *Proceedings of the 2nd ACM Conference on Computer and Communication Security*, 1994, (Purdue Technical Report CSD-TR-93-071), 18 pages.

* cited by examiner

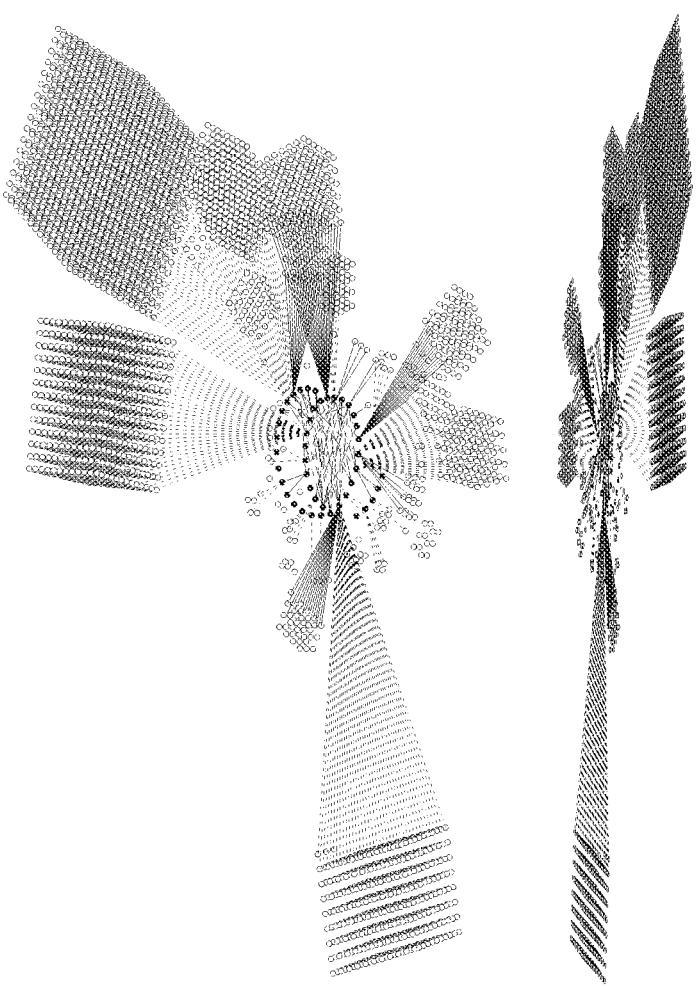

SYSTEM AND METHOD FOR THREE-DIMENSIONAL VISUALIZATION OF VULNERABILITY AND ASSET DATA

CROSS-REFERENCE TO RELATED APPLICATIONS

This application is related to co-pending U.S. patent application Ser. No. 10/863,238, entitled "System and Method for Managing Network Vulnerability Analysis Systems," filed Jun. 9, 2004, co-pending U.S. patent application Ser. No. 11/016,761, entitled "System and Method for Scanning a Network," filed Dec. 21, 2004, U.S. patent application Ser. No. 11/313,710, entitled "System and Method for Managing Events," filed Dec. 22, 2005, now abandoned, co-pending U.S. patent application Ser. No. 12/693,803, entitled "System and Method for Correlating Network Identities and Addresses," filed Jan. 26, 2010, co-pending U.S. patent application Ser. No. 12/695,659, entitled "System and Method for Enabling Remote Registry Service Security Audits," filed Jan. 28, 2010, and co-pending U.S. patent application Ser. No. 12/729,036, entitled "System and Method for Passively Identifying Encrypted and Interactive Network Sessions," filed Mar. 22, 2010, the contents of which are hereby incorporated by reference in their entirety.

FIELD OF THE INVENTION

The invention relates to a system and method for three-dimensional visualization of vulnerability and asset data, and in particular, to a management console that integrates one or more active vulnerability scanners, one or more passive vulnerability scanners, and a log correlation engine distributed in a network, and further to a three-dimensional visualization tool in the management console that can be used to generate three-dimensional visualizations that graphically represent vulnerabilities and assets in the network from the integrated information that management console collects the active vulnerability scanners, the passive vulnerability scanners, and the log correlation engine distributed in the network.

BACKGROUND OF THE INVENTION

In many network environments, illegal or unauthorized users may exploit vulnerabilities in the network to gain access, deny access, or otherwise attack systems in the network. As such, to detect and remediate such network vulnerabilities, existing network security systems typically conduct vulnerability analysis in the network through manual inspection or network scans. For example, conventional network scanners (or "active vulnerability scanners") typically send packets or other messages to various devices in the network and then audit the network with information contained in any response packets or messages received from the devices in the network. Accordingly, physical limitations associated with the network typically limit the effectiveness for active vulnerability scanners because only devices that can communicate with the active vulnerability scanners can be audited, while actively scanning networks distributed over large areas or having large numbers of devices may take long amounts of time. For example, in a network that includes multiple routers, hosts, and other network devices, an active vulnerability scanner would typically have to send packets that traverse several routers to scan the hosts and other network devices, some of which may be inactive and therefore inaccessible to the active vulnerability scanner. Further, in scenarios where one or more of the routers have firewalls that screen or otherwise filter incoming and outgoing traffic, the active vulnerability scanner may generate incomplete results because the firewalls may prevent the active vulnerability scanner from auditing hosts or other devices behind the firewalls.

Furthermore, active vulnerability scanners typically create audit results that become stale over time because the audit results describe a static state for the network at a particular point in time. Thus, an active vulnerability scanner would likely fail to detect that hosts have been added or removed from the network following a particular active scan, whereby the audit results that active vulnerability scanners create tend to steadily decrease in value over time as changes to the network occur. Furthermore, active vulnerability scanners can have the tendency to cause network disruptions during an audit. For example, probing network hosts or other devices during an audit performed by an active vulnerability scanner may result in communication bottlenecks, processing overhead, and instability, among other potential problems in the network. Thus, deployment locations, configurations, and other factors employed to manage networks can often interfere with obtaining suitable network auditing results using only active vulnerability scanners.

As such, existing systems that tend to rely entirely on active vulnerability scanners typically prevent the active vulnerability scanner from obtaining comprehensive information that describes important settings, configurations, or other information associated with the network. In particular, malicious or unauthorized users often employ various techniques to obscure network sessions during an attempted breach, but active vulnerability scanners often cannot detect real-time network activity that may provide indications that the attempted breach is occurring. For example, many backdoor and rootkit applications tend to use non-standard ports and custom protocols to obscure network sessions, whereby intruders may compromise the network while escaping detection. Thus, many active vulnerability scanners can only audit the state of a network at a particular point in time, but suitably managing network security often requires further insight relating to real-time activity that occurs in the network. Accordingly, although active vulnerability scanners typically employed in existing network security systems can obtain certain information describing the network, existing systems cannot perform comprehensive security audits to completely describe potential vulnerabilities in the network, build models or topologies for the network, or derive other information that may be relevant to managing the network.

Furthermore, in many instances, certain hosts or devices may participate in sessions occurring on the network, yet the limitations described above can prevent active vulnerability scanners alone from suitably auditing the hosts or devices. As such, various existing network security systems employ one or more passive vulnerability scanners in combination with active vulnerability scanners to analyze traffic traveling across the network, which may supplement the information obtained from the active vulnerability scanners. However, even when employing passive vulnerability scanners in combination with active vulnerability scanners, the amount of data returned by the active vulnerability scanners and the passive vulnerability scanners can often be quite substantial, which can lead to difficulties in administrating the potentially large number of vulnerabilities and assets in the network. For example, many network topologies may include hundreds, thousands, or even larger numbers of nodes, whereby suitably representing the network topologies in a manner that provides visibility into the network can be unwieldy. In particular, existing network security systems typically represent network topologies in two dimensions, which can produce visual representations that may be difficult to view (e.g., many routers, devices, or other hosts may be clustered in a small area, such that a two-dimensional visual representation may obscure distinctions between the various routers, devices, or other hosts).

Accordingly, a need exists for a network security system that can aggregate information describing a network from various sources in order to generate visual representations that represent various network vulnerabilities and network assets in a manner that can simplify management of the various vulnerabilities and assets in the network.

SUMMARY OF THE INVENTION

Accordingly to one aspect of the invention, the system and method for three-dimensional visualization of vulnerability and asset data described herein may distribute one or more active vulnerability scanners, one or more passive vulnerability scanners, and a log correlation engine at various locations in a network, and the system and method described herein may further distribute a management console in communication with the active vulnerability scanners, the passive vulnerability scanners, and the log correlation engine, whereby the management console may provide a comprehensive solution to manage topologies, vulnerabilities, assets, and other information associated with the network.

Accordingly to one aspect of the invention, the active vulnerability scanners may interrogate various devices in the network to build a model or topology of the network and identify various vulnerabilities in the network, wherein the active vulnerability scanners may be distributed in different locations across the network to reduce network stress (e.g., the active vulnerability scanners may scan certain portions of the network in parallel, whereby an amount of time to perform the active vulnerability scans may be reduced). In one implementation, one or more of the active vulnerability scanners may be distributed at a location that provides visibility into portions of a remote network. Thus, limiting the portions of the network and/or the remote network that the active vulnerability scanners interrogate, probe, or otherwise scan, and having the active vulnerability scanners perform the scans in parallel may reduce the amount of time that the active vulnerability scans consume because the active vulnerability scanners can be distributed closer to scanning targets, the active vulnerability scanners may scan limited portions of the network rather than the entire network, and the parallel active scans may obtain information from the different portions of the network in an amount of time that substantially corresponds to the amount of time associated with one active scan. As such, the active vulnerability scanners may generally scan the respective portions of the network to obtain information describing vulnerabilities and assets in the network, perform credentialed patch audits, test web applications, audit operating system configurations, audit database configurations, search for sensitive content, or otherwise obtain information describing the network. For example, in one implementation, the active vulnerability scanners 210 may perform the various active probes to obtain a snapshot that describes assets actively running in the network at a particular point in time, wherein the snapshot may further include any exposures that the actively running assets to vulnerabilities in the network, configurations for the assets in the network, or other information suitably describing the vulnerabilities and assets active in the network.

Accordingly to one aspect of the invention, the passive vulnerability scanners may passively observe traffic in the network to further build the model or topology of the network and further identify the vulnerabilities in the network and detect activity that may potentially target the vulnerabilities. In one implementation, the passive vulnerability scanners may be distributed at various locations in the network to monitor traffic traveling across the network, including traffic originating from the remote network and/or directed to the remote network, thereby supplementing the information obtained by the active vulnerability scanners. For example, the passive vulnerability scanners may monitor the traffic to identify vulnerabilities, assets, or information from that the active vulnerability scanners may be unable to obtain from previously inactive assets that subsequently participate in network sessions. Additionally, the passive vulnerability scanners may be deployed directly within or adjacent to an intrusion detection system sensor, which may provide visibility into intrusion events or other security exceptions that the intrusion detection system sensor identifies. Thus, the passive vulnerability scanners may generally sniff packets traveling across, originating from, or directed to the network to identify new hosts, open ports, client/server applications, vulnerabilities, network sessions, or information associated with the activity that occurs in the network. In one implementation, the information that the passive vulnerability scanners obtains from sniffing the traffic associated with the network may therefore provide a real-time record describing the activity that occurs in the network, whereby the passive vulnerability scanners may behave like a security motion detector on the network (i.e., mapping and monitoring any vulnerabilities, assets, services, applications, sensitive data, and other information that newly appear or change in the network).

Accordingly to one aspect of the invention, the log correlation engine may receive logs containing one or more events from various sources distributed across the network (e.g., logs describing network activity, operating system events, file modification events, USB device insertion events, etc.). For example, in one implementation, the log correlation engine may normalize the events contained in the various logs received from the sources distributed across the network, and in one implementation, may further aggregate the normalized events with information describing the snapshot of the network obtained by the active vulnerability scanners and/or the network traffic observed by the passive vulnerability scanners. As such, the log correlation engine may analyze and correlate the events contained in the logs, the information describing the observed network traffic, and/or the information describing the snapshot of the network to automatically detect statistical anomalies, correlate intrusion events or other events with the vulnerabilities and assets in the network, search the analyzed and correlated information for data meeting certain criteria, or otherwise manage vulnerabilities and assets across the network. Furthermore, the log correlation engine may filter the information to be normalized, analyzed, and correlated to information relevant to a certain security posture (e.g., rather than processing thousands or millions of events generated across the network, which could take a substantial amount of time, the log correlation engine may identify subsets of the events that relate to particular events relevant to the security posture). In one implementation, the log correlation engine may further save the events contained in all of the logs to comply with regulatory requirements, which often provide that all logs must be stored for a certain period of time (e.g., saving the events in all of the logs to comply with the regulatory requirements while only normalizing, analyzing, and correlating the events in a subset of the logs that relate to a certain security posture). Thus, the log correlation engine may aggregate, normalize, analyze, and correlate information received in various event logs, snapshots obtained by the active vulnerability scanners, and/or the activity observed by the passive vulnerability scanners to comprehensively monitor, remediate, and otherwise manage the vulnerabilities and assets in the network.

According to one aspect of the invention, as noted above, the management console may integrate the information obtained by the active vulnerability scanners, the passive vulnerability scanners, and the log correlation engine. The management console may therefore provide a unified solution that aggregates the vulnerability and asset information obtained by the active vulnerability scanners, the passive vulnerability scanners, and the log correlation engine, whereby the management console may comprehensively manage governance, risk, and compliance across the network. In one implementation, the management console may further include a three-dimensional visualization tool that provides capabilities that administrators or other suitable users can use to search the information aggregated at the management console for particular vulnerabilities, assets, compliance data, or other information relating to the network. Thus, the three-dimensional visualization tool included in the management console may generate three-dimensional visualizations that graphically represent the vulnerabilities, assets, compliance data, or other information relating to the network in a manner that can simplify management of the network.

According to one aspect of the invention, the system and method described herein may include collecting the information describing the vulnerabilities and assets in the network from the active vulnerability scanners, the passive vulnerability scanners, and the log correlation engine distributed in the network. For example, in response to the management console receiving the information obtained by the active vulnerability scanners, the passive vulnerability scanners, and the log correlation engine, the management console may then build a topology or model of the network from such information. In particular, the model or topology may include characteristics describing the various devices and services discovered in the network and relationships between the various devices and services. Furthermore, the model or topology may be automatically updated in response to new or changed information discovered in subsequent active vulnerability scans, subsequently observed network traffic, or subsequently analyzed event logs. In one implementation, in response to suitably building the topology of the network, the management console may analyze the topology to identify various vulnerabilities in the network, and in one implementation, the management console may provide capabilities to search and query the topology or model of the network. As such, in response to receiving a search request or query, the management console may filter the network topology and vulnerabilities to identify a subset of the devices in the topology that match criteria in the search request or query. Furthermore, the management console may support multiple simultaneous or comparative search requests or queries, wherein the multiple search requests or queries may be analyzed substantially simultaneously to determine visual differences between filtering the topology and vulnerabilities based on criteria in the multiple search requests or queries.

According to one aspect of the invention, the system and method described herein may further include a three-dimensional visualization tool associated with the management console, wherein the three-dimensional visualization tool may be used to create three-dimensional visualizations of the network topology and/or vulnerabilities. For example, the three-dimensional visualization may place every routing node in the network on a cylindrical spiral or helix, and may further place hosts that communicate with the routing nodes in leaf nodes linked to the routing nodes nearest to the respective hosts (i.e., the leaf nodes may be linked to the nearest routing nodes in vectors directed outward from the helical or cylindrical spiral). Thus, placing the routing nodes in the helical or cylindrical spiral and then placing all leaf nodes in outward vectors that connect to the routing nodes in the helical or cylindrical spiral may enable the three-dimensional visualization to simultaneously display large numbers of nodes. In another example, the three-dimensional visualization may describe relationships between ports, vulnerabilities, Internet Protocol (IP) addresses, and/or other assets in the network (i.e., one horizontal axis may include ports, vulnerabilities, Internet Protocol (IP) addresses, and/or other assets within a first range and the other horizontal axis may include ports, vulnerabilities, Internet Protocol (IP) addresses, and/or other assets within a second range, while a vertical axis may visualize a frequency or other trait associated with a relationship between the elements represented on each horizontal axis. Furthermore, in one implementation, various visual effects may be applied to the three-dimensional visualization (e.g., color codes may represent values or other properties for assets, vulnerabilities, or other elements in the three-dimensional visualization, a rotation visual effect may be applied to a three-dimensional network topology to provide different visualizations of the routing topology shown therein, a mirroring visual effect may be applied to the three-dimensional network topology to represent a reflection of the topology, etc.).

Other objects and advantages of the invention will be apparent to those skilled in the art based on the following drawings and detailed description.

BRIEF DESCRIPTION OF THE DRAWINGS

FIGS. 5A-5E illustrate exemplary screenshots of three-dimensional visualizations of vulnerability and asset data produced in the systems and methods shown in FIGS. 1-4, according to one aspect of the invention.

DETAILED DESCRIPTION

Figure 1:
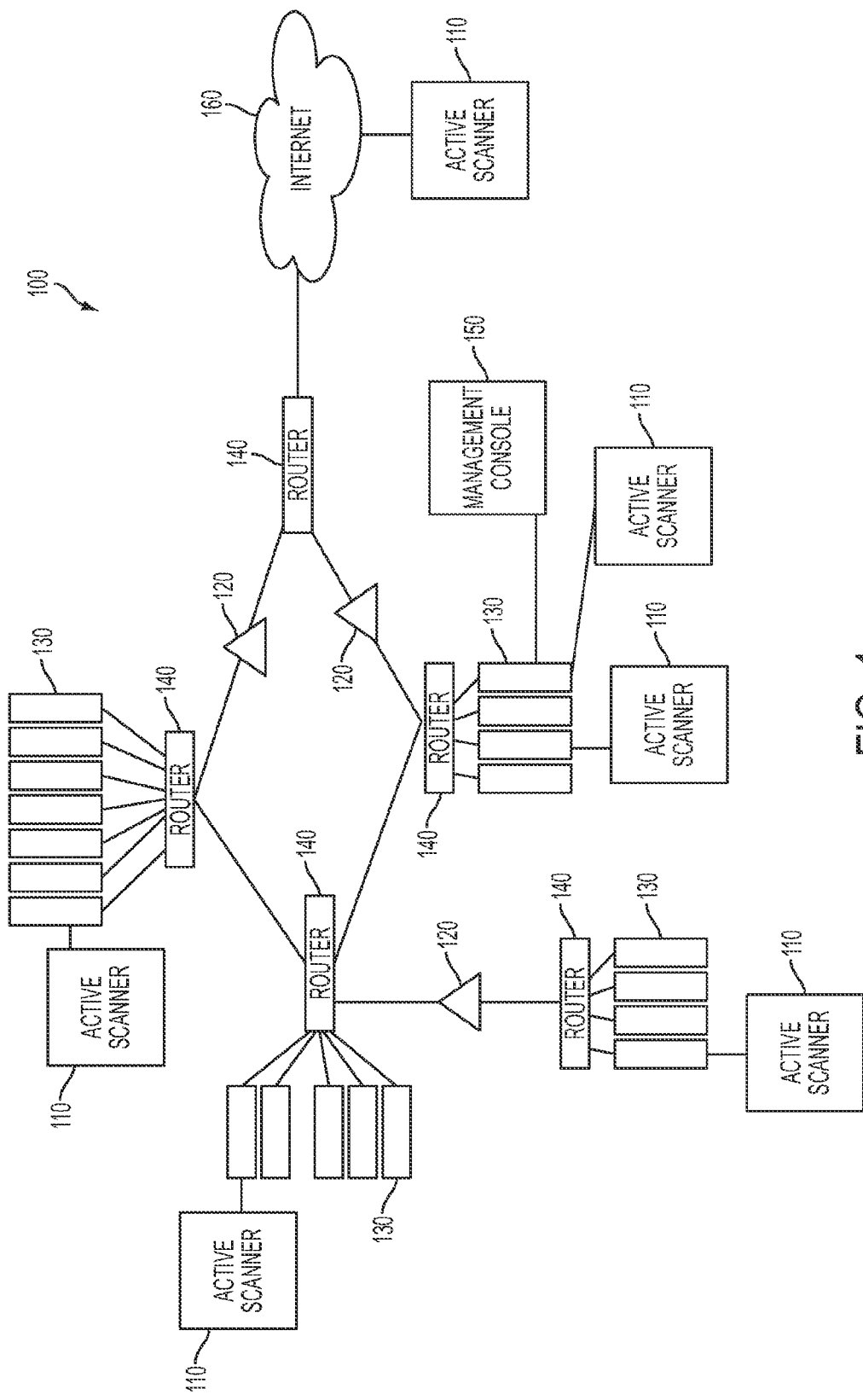
FIG. 1 illustrates a schematic diagram of an exemplary system for three-dimensional visualization of vulnerability and asset data, according to one aspect of the invention.

According to one aspect of the invention, FIG. 1 illustrates a schematic diagram of an exemplary system 100 for three-dimensional visualization of vulnerability and asset data in a network. In particular, the system 100 shown in FIG. 1 may generally include one or more passive vulnerability scanners 120 that can observe traffic in a packet stream traveling in a network to identify vulnerabilities in the network and detect activity that may target the identified vulnerabilities, and may further include one or more active vulnerability scanners 110 that can communicate packets or other messages within the network to detect new or changed information describing various routers 140, hosts 130, servers 130, or other devices 130 in the network. For example, in one implementation, the active vulnerability scanners 110 may scan certain hosts 130, servers 130, or other devices 130 in the network during a security audit. The information obtained from the active vulnerability scanners 110 actively scanning the devices 130 may then be analyzed to identify potential vulnerabilities in the network. In one implementation, the passive vulnerability scanners 120 may observe packet stream traversing the network to identify further potential vulnerabilities in the network, wherein the passive vulnerability scanners 120 may then further observe the packet stream to detect any activity potentially targeting the vulnerabilities identified by the active vulnerability scanners 110 and/or the passive vulnerability scanners 120.

In one implementation, as noted above, the active vulnerability scanners 110 may generally communicate various packets or other messages within the network to illicit responses from hosts 130, servers 130, or other devices 130 in the network. In contrast, the passive vulnerability scanners 120 may generally observe (or "sniff") various packets in the packet stream traversing the network to passively scan the network. In particular, the passive vulnerability scanners 120 may reconstruct one or more sessions in the network from information contained in the packets sniffed in the packet stream, wherein the reconstructed network sessions may then be used to build a model or topology describing the network (e.g., any routers 140, hosts 130, servers 130, or other devices 130 actively running in the network, any services actively running on the routers 140, hosts 130, servers 130, or other devices 130, etc.). In one implementation, the passive vulnerability scanners 120 may further apply various signatures to the information observed in the packet stream to identify vulnerabilities in the network and determine whether any packets in the packet stream potentially target such vulnerabilities. In one implementation, the passive vulnerability scanners 120 may observe the packet stream continuously, at periodic intervals, on a pre-configured schedule, or in response to determining that certain criteria or conditions have been satisfied. The passive vulnerability scanners 120 may then automatically reconstruct the network sessions, build or update the network model, identify the network vulnerabilities, and detect the traffic potentially targeting the network vulnerabilities in response to any new or changed information in the network.

In one implementation, the passive vulnerability scanners 120 may generally observe the packet stream traveling across the network to reconstruct one or more sessions occurring in the network. The passive vulnerability scanners 120 may then analyze the reconstructed network sessions to identify various potential vulnerabilities in the network and/or activity targeting the potential vulnerabilities, including one or more of the reconstructed sessions having interactive or encrypted characteristics (e.g., the passive vulnerability scanners 120 may identify the sessions having the interactive or encrypted characteristics in response to determining that various packets in the packet stream had certain sizes, frequencies, randomness, or other qualities that may indicate potential backdoors, covert channels, or other vulnerabilities in the network). Thus, the passive vulnerability scanners 120 may monitor the network in real-time to detect any potential vulnerabilities in the network in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Thus, in one implementation, the passive vulnerability scanners 120 may identify changes in the network from the encrypted and interactive network sessions (e.g., a new e-commerce server 130 may be identified in response to the passive vulnerability scanners 120 observing an encrypted and/or interactive session between a host in a remote network 160 and a certain port on the server 130 typically used to process electronic transactions). In one implementation, the passive vulnerability scanners 120 may observe as many sessions in the network as possible to provide optimal visibility into the network and the activity that occurs in the network. For example, in one implementation, the passive vulnerability scanners 120 may be deployed at a network hub 140, a spanned switch port 140, a network tap 140, a network choke point 140, a dial up node 130, a server farm 130, behind a firewall, or any other suitable location that enables the passive vulnerability scanners 120 to observe incoming and outgoing traffic in the network. In one implementation, the passive vulnerability scanners 120 may generally be deployed on any suitable server 130 or other host 130 in the network that runs a suitable operating system (e.g., a RED HAT LINUX™ or FREEBSD™ open source operating system, a UNIX™, WINDOWS™, or MAC OS X™ operating system, etc.).

Furthermore, in one implementation, the system 100 shown in FIG. 1 may further include a management console 150 that can provide a unified security monitoring solution for managing the vulnerabilities and assets in the network (e.g., Tenable SecurityCenter, available from Tenable Network Security). In particular, the management console 150 may aggregate the information obtained from the active vulnerability scanners 110 actively scanning the routers 140, servers 130, hosts 130, and other devices 130 in the network and the information obtained from the passive vulnerability scanners 120 sniffing the packets in the packet stream traveling across the network. Thus, the management console 150 may collect information from the active vulnerability scanners 110 and the passive vulnerability scanners 120 to build the model of the network, which may generally include information describing various vulnerabilities, applied or missing patches, intrusion events, anomalies, event logs, configuration audits, file integrity audits, or any other information that may be relevant to managing the vulnerabilities and assets in the network. As such, the management console 150 may provide a unified interface for mitigating and managing governance, risk, and compliance across the network. In one implementation, further detail relating to interaction between the management console 150, the active vulnerability scanners 110, and the passive vulnerability scanners 120 may be found in "Unified Security Monitoring (USM)—Real-Time Situational Awareness of Network Vulnerabilities, Events and Configurations," by Renaud Deraison et al., the contents of which are hereby incorporated by reference in their entirety.

Figure 2:
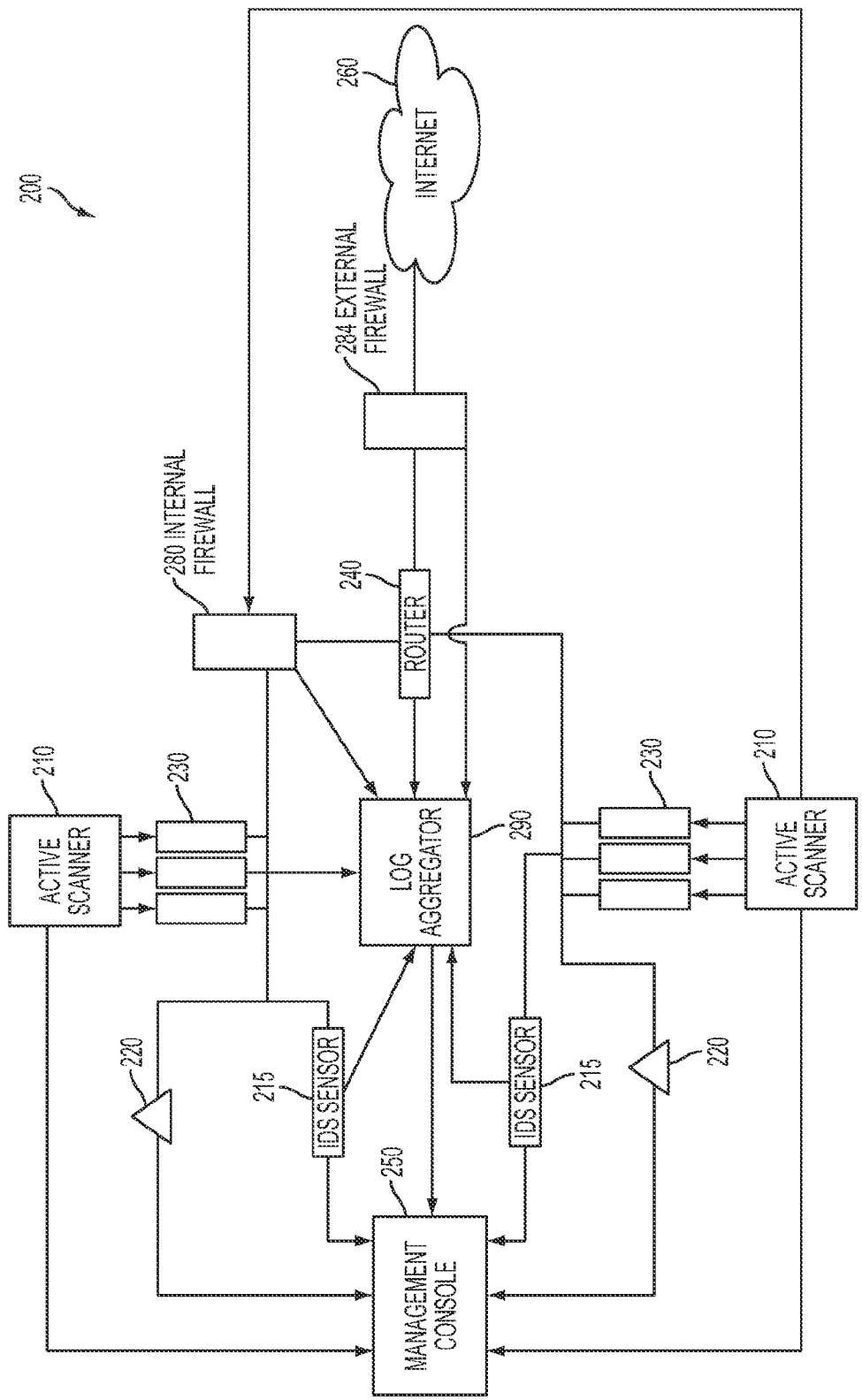
FIG. 2 illustrates another schematic diagram of the system for three-dimensional visualization of vulnerability and asset data, according to one aspect of the invention.

According to one aspect of the invention, FIG. 2 illustrates another schematic diagram of the system 200 for three-dimensional visualization of vulnerability and asset data. In particular, the system 200 shown in FIG. 2 may generally provide substantially similar functionality to the system 100 shown in FIG. 1 and described above. For example, in one implementation, the system 200 may include one or more active vulnerability scanners 210, which may interrogate devices 230 in the network to build a model or topology of the network and identify various vulnerabilities in the network, one or more passive vulnerability scanners 220 that can passively observe traffic in the network to further build the model or topology of the network and further identify the vulnerabilities in the network, and detect activity that may potentially target the vulnerabilities. Additionally, in one implementation, the system 200 may further include a log correlation engine (or log aggregator) 290, which may receive logs containing one or more events from various sources distributed across the network (e.g., logs generated by internal firewalls 280, external firewalls 284, routers 240, servers 230, devices 230, operating systems, applications, or other sources in the network). Thus, in one implementation, the information obtained from the active vulnerability scanners 210, the passive vulnerability scanners 220, and the log correlation engine 290 may be provided to a management console 250, which may generate a comprehensive model describing topologies, vulnerabilities, assets, and other information associated with the network.

In one implementation, the active vulnerability scanners 210 may be distributed in locations across the network to reduce stress on the network. For example, the active vulnerability scanners 210 may be distributed at different locations in the network in order to scan certain portions of the network in parallel, whereby an amount of time to perform the active vulnerability scans may be reduced. Furthermore, in one implementation, one or more of the active vulnerability scanners 210 may be distributed at a location that provides visibility into portions of a remote network 260 (e.g., as shown in FIG. 1, one or more of the active vulnerability scanners 210 may be distributed at a location in communication with the remote network 260). Thus, limiting the portions of the network and/or the remote network 260 that the active vulnerability scanners 210 interrogate, probe, or otherwise scan and having the active vulnerability scanners 210 perform the scans in parallel may reduce the amount of time that the active vulnerability scans consume because the active vulnerability scanners 210 can be distributed closer to scanning targets (e.g., routers 240, internal firewalls 280, external firewalls 284, servers 230, hosts 230, devices 230, etc.). In particular, because the active vulnerability scanners 210 may scan limited portions of the network rather than the entire network, and further because the parallel active scans may obtain information from the different portions of the network, the amount of time that the active scans consume may substantially correspond to the amount of time associated with one active scan.

As such, in one implementation, the active vulnerability scanners 210 may generally scan the respective portions of the network to obtain information describing vulnerabilities and assets in the network. In particular, as described in "Unified Security Monitoring (USM)—Real-Time Situational Awareness of Network Vulnerabilities, Events and Configurations," the contents of which are incorporated by reference above, the active vulnerability scanner 210 may perform the active vulnerability and asset scans in the network (e.g., scheduled active scans, distributed active scans, etc.), credentialed patch audits, web application tests, operating system configuration audits, database configuration audits, sensitive file or content searches, or other active probes to obtain information describing the network. For example, in one implementation, the active vulnerability scanners 210 may perform the various active probes to obtain a snapshot that describes assets actively running in the network at a particular point in time (e.g., actively running routers 240, internal firewalls 280, external firewalls 284, servers 230, hosts 230, etc.), wherein the snapshot may further include any exposures that the actively running assets to vulnerabilities identified in the network (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network. In one implementation, in response to obtaining the snapshot of the network, the active vulnerability scanners 210 may then report the information describing the snapshot to the management console 250, which may use the information provided by the active vulnerability scanners 210 to remediate and otherwise manage the vulnerabilities and assets in the network.

Furthermore, in one implementation, the passive vulnerability scanners 220 may be distributed at various locations in the network to monitor traffic traveling across the network, traffic originating within the network and directed to the remote network 260, and traffic originating within the remote network 260 and directed to the network, thereby supplementing the information obtained by the active vulnerability scanners 210. For example, in one implementation, the passive vulnerability scanners 220 may monitor the traffic traveling across the network and the traffic originating from and/or directed to the remote network 260 to identify vulnerabilities, assets, or information from that the active vulnerability scanners 210 may be unable to obtain because the traffic may be associated with previously inactive assets that later participate in sessions that occur in the network. Additionally, in one implementation, the passive vulnerability scanners 220 may be deployed directly within or adjacent to a sensor 215 for an intrusion detection system, which may provide the passive vulnerability scanners 220 with visibility relating to intrusion events or other security exceptions that the sensor 215 for the intrusion detection system identifies. In one implementation, the intrusion detection system may generally include an open source network intrusion prevention and detection system (e.g., Snort), a packet analyzer, or any other suitable system that having a sensor 215 that can detect and prevent intrusion or other security events in the network.

Thus, the passive vulnerability scanners 220 may generally sniff one or more packets in the traffic traveling across, originating from, or directed to the network to identify new routers 240, internal firewalls 280, external firewalls 284, or other hosts 230 in addition to open ports, client/server applications, any vulnerabilities, or other activity associated therewith. In addition, the passive vulnerability scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network. In one implementation, the information that the passive vulnerability scanners 220 obtains from sniffing the traffic traveling across, originating from, or directed to the network may therefore provide a real-time record describing the activity that occurs in the network, whereby the passive vulnerability scanners 220 may behave like a security motion detector on the network (i.e., mapping and monitoring any vulnerabilities, assets, services, applications, sensitive data, and other information that newly appear or change in the network). The passive vulnerability scanners 220 may then report the information obtained from the traffic monitored in the network to the management console 250, which may use the information provided by the passive vulnerability scanners 220 in combination with the information provided by the active vulnerability scanners 210 to remediate and otherwise manage the network.

in one implementation, as noted above, the system 200 shown in FIG. 2 may further include a log correlation engine 290, which may receive logs containing one or more events from various sources distributed across the network (e.g., logs describing network activity, operating system events, file modification events, USB device insertion events, etc.). In particular, the logs received at the log correlation engine 290 may include events generated by one or more of the internal firewalls 280, external firewalls 284, routers 240, servers 230, devices 230, or other hosts 230 in the network in addition to events generated by one or more operating systems, applications, or other sources in the network (e.g., as described in co-pending U.S. patent application Ser. No. 10/863,238 and co-pending U.S. patent application Ser. No. 12/693,803, the contents of which are incorporated by reference above). For example, in one implementation, the log correlation engine 290 may normalize the events contained in the various logs received from the sources distributed across the network, and in one implementation, may further aggregate the normalized events with information describing the snapshot of the network obtained by the active vulnerability scanners 210 and/or the network traffic observed by the passive vulnerability scanners 220. As such, the log correlation engine 290 may then analyze and correlate the events contained in the logs, the information describing the observed network traffic, and/or the information describing the snapshot of the network to automatically detect statistical anomalies, correlate intrusion events or other events with the vulnerabilities and assets in the network, search the analyzed and correlated information for data meeting certain criteria, or otherwise manage vulnerabilities and assets across the network.

Furthermore, in one implementation, the log correlation engine 290 may filter the events contained in the logs, the information describing the observed network traffic, and/or the information describing the snapshot of the network to limit the information that the log correlation engine 290 normalizes, analyzes, and correlates to information relevant to a certain security posture (e.g., rather than processing thousands or millions of events generated across the network, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). Thus, the log correlation engine 290 may aggregate, normalize, analyze, and correlate information received in various event logs, snapshots obtained by the active vulnerability scanners 210, and/or the activity observed by the passive vulnerability scanners 220 to comprehensively monitor, remediate, and otherwise manage the vulnerabilities and assets in the network. Additionally, in one implementation, the log correlation engine 290 may report information relating to the information received and analyzed by the log correlation engine to the management console 250, which may use the information provided by the log correlation engine 290 in combination with the information provided by the passive vulnerability scanners 220 and the active vulnerability scanners 210 to remediate and otherwise manage the network.

Accordingly, in one implementation, the active vulnerability scanners 210 may generally interrogate any suitable device 230 in the network to obtain information describing a snapshot of the network at any particular point in time, the passive vulnerability scanners 220 may continuously or periodically observe traffic traveling in the network to identify vulnerabilities, assets, or other information that further describes the network, and the log correlation engine 290 may collect additional information to further identify the vulnerabilities, assets, or other information describing the network. The management console 250 may therefore provide a unified solution that aggregates the vulnerability and asset information obtained by the active vulnerability scanners 210, the passive vulnerability scanners 220, and the log correlation engine 290 to comprehensively manage governance, risk, and compliance across the network (e.g., as described in "Unified Security Monitoring (USM)—Real-Time Situational Awareness of Network Vulnerabilities, Events and Configurations," the contents of which are incorporated by reference above). Furthermore, in one implementation, the management console 250 may further include a three-dimensional visualization tool, which may provide capabilities for administrators or other suitable users of the network to search the information aggregated at the management console 250 for certain vulnerabilities, assets, compliance data, or other information relating to the network. Thus, as will be described in greater detail below with reference to FIGS. 3 through 5, the three-dimensional visualization tool included in the management console 250 may be used to generate three-dimensional visualizations that graphically represent the vulnerabilities, assets, compliance data, or other information relating to the network in a manner that can simplify management of the network.

Figure 3:
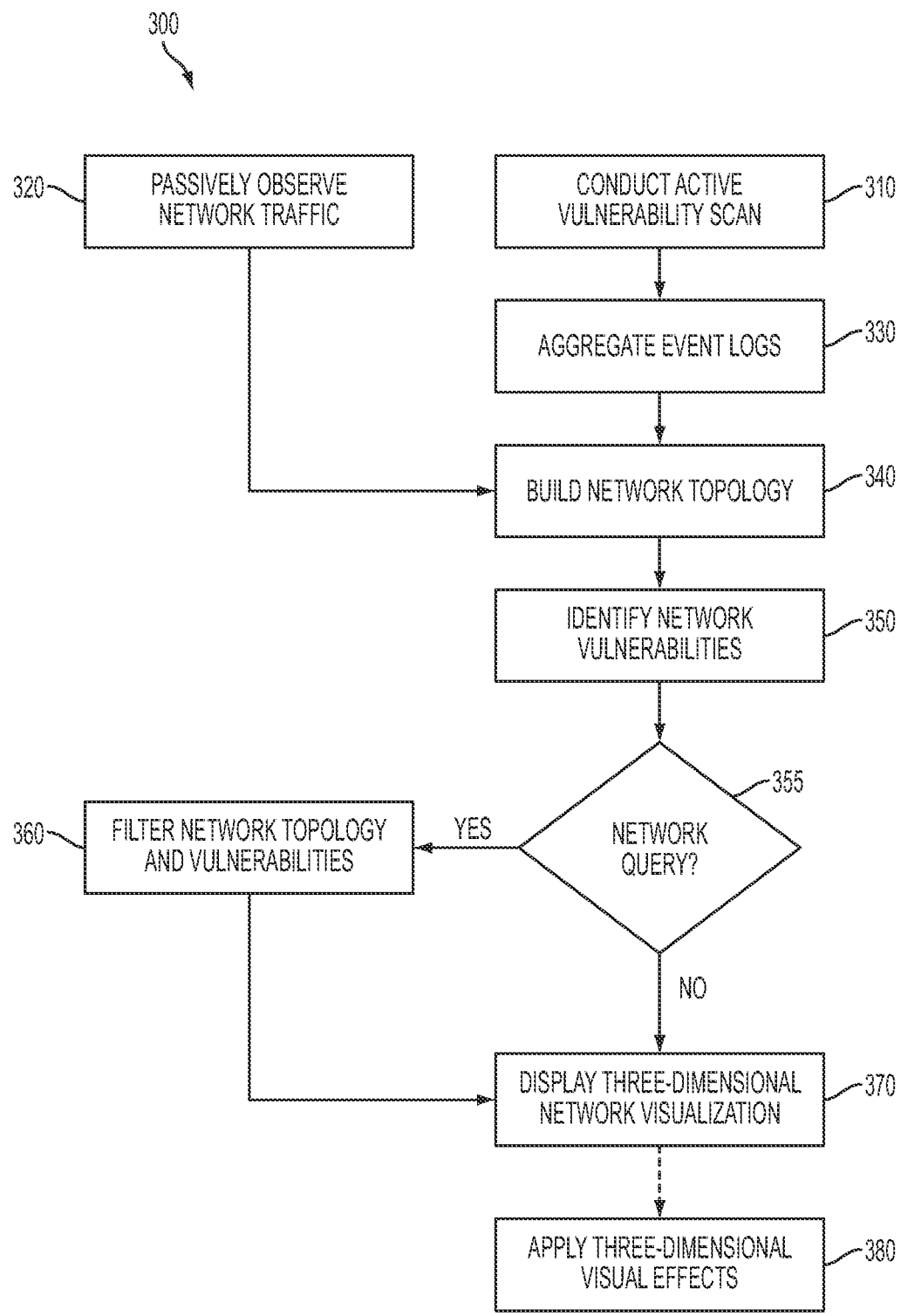
FIG. 3 illustrates a flowchart of an exemplary method for three-dimensional visualization of vulnerability and asset data, according to one aspect of the invention.

According to one aspect of the invention, FIG. 3 illustrates a flowchart of an exemplary method 300 for three-dimensional visualization of vulnerability and asset data. In one implementation, the method 300 shown in FIG. 3 and described herein may generally operate in the systems illustrated in FIGS. 1 and 2 described above. In particular, the method 300 may be performed at a management console that collects information that describes vulnerabilities and assets in a network, wherein the management console may receive the collected information describing the vulnerabilities and assets in the network from one or more active vulnerability scanners, one or more passive vulnerability scanners, and a log correlation engine distributed in the network. For example, as will be described in further detail herein, the active vulnerability scanners may conduct one or more active vulnerability scans in the network during an operation 310, the passive vulnerability scanners may passively observe traffic traveling in the network during an operation 320, and the log correlation engine may aggregate various logs that contain events generated in the network during an operation 330. Furthermore, as will be apparent, operations 310, 320, and 330 may be performed substantially simultaneously, sequentially, or in any other suitable sequence.

In one implementation, as noted above, the method 300 illustrated in FIG. 3 may include, among other things, the active vulnerability scanners conducting one or more active vulnerability scans in the network during operation 310. In particular, operation 310 may generally include the active vulnerability scanners communicating various packets or other messages within the network to illicit responses from various routers, servers, hosts, devices, or running services in the network. As such, in one implementation, operation 310 may further include the active vulnerability scanners discovering any new or changed information describing any routers, servers, hosts, devices, or running services that respond to the communicated packets or messages, and may further include the active vulnerability scanners discovering one or more vulnerabilities associated with the various routers, servers, hosts, devices, or running services. In one implementation, the active vulnerability scanners may include any suitable combination of publicly available active vulnerability scanners, active vulnerability scanners with complimentary licenses, or professionally licensed active vulnerability scanners (e.g., Nessus or Nessus Pro, also available from Tenable Network Security). Furthermore, in one implementation, the active vulnerability scanners may employ a Nessus Attack Scripting Language (NASL), which may enable the active vulnerability scanners to interact with the devices and the services discovered in the network.

For example, in one implementation, the active vulnerability scans conducted in operation 310 may include a remote registry service audit, which may include the active vulnerability scanners temporarily enabling a remote registry service running on one or more of the routers, servers, hosts, or other devices, remotely scanning registries associated with such devices to determine operating systems running on the devices and potential vulnerabilities associated with such operating systems, and then disabling the remote registry service to prevent unauthorized or malicious activity (e.g., as described in co-pending U.S. patent application Ser. No. 12/695,659, incorporated by reference above). In another example, the active vulnerability scans conducted in operation 310 may include discovering Ethernet addresses or other network addresses for the devices discovered in the network, including remote hosts or remote devices that communicate with the network from remote networks. Thus, in one implementation, operation 310 may further include creating one or more dynamic asset lists that describe the discovered devices based on the discovered network addresses (e.g., as described in co-pending U.S. patent application Ser. No. 12/693,803, incorporated by reference above). Thus, operation 310 may generally include conducting various active vulnerability scans in the network, wherein information obtained in the active vulnerability scans may then be forwarded to a management console for further analysis.

In one implementation, as noted above, the method 300 may further include operation 320, wherein operation 320 may include the passive vulnerability scanners passively observing traffic traveling in the network. For example, operation 320 may generally include the passive vulnerability scanners sniffing various packets in a packet stream traveling across the network to supplement the information obtained from the active vulnerability scanners in operation 310. In particular, operation 320 may include the passive vulnerability scanners discovering any new or changed information describing routers, servers, hosts, devices, or services participating in one or more network sessions associated with the observed traffic, and may further include the passive vulnerability scanners discovering one or more vulnerabilities associated with the various routers, servers, hosts, devices, or services that participate in the observed network sessions. For example, in response to observing a Transmission Control Protocol (TCP) SYN-ACK packet originating from port twenty-five on a particular device, the passive vulnerability scanners may determine that the SYN-ACK packet represents new information to the model. Thus, from analyzing SYN and SYN-ACK packets in the packet stream, the passive vulnerability scanner may determine a status, identity, or other information describing devices and services that participate in the sessions observed in the network.

In one implementation, the SYN and SYN-ACK packets described above may further provide information that can be used to identify operating systems running on the devices active in the network. For example, different operating systems (e.g., LINUX™, WINDOWS XP™, Solaris, etc.) tend to build SYN packets that can be uniquely distinguished from SYN packets originating from other operating systems, whereby the passive vulnerability scanner may analyze a structure for SYN packets originating from a certain device to determine an operating system running on the device. In one implementation, the passive vulnerability scanner may further analyze applications running on the devices to uniquely identify the operating systems running on the devices. For example, certain web browsers, email applications, and other applications often employ certain protocols to communicate information describing underlying operating systems, whereby the passive vulnerability scanners may detect such information in the observed traffic to identify the underlying operating systems associated with the traffic. Furthermore, in response to recognizing new or changed information describing the devices or services that participate in the observed network sessions, operation 320 may further include the passive vulnerability scanner searching and/or scanning the new or changed information to identify potential vulnerabilities in the network. For example, in one implementation, operation 320 may include the passive vulnerability scanners performing simple banner analysis to identify known vulnerability signatures, performing intelligent banner analysis to handle any network sessions that involve more complex communication protocols, or analyzing the observed traffic to identify one or more of the sessions that have interactive or encrypted characteristics (e.g., as described in co-pending U.S. patent application Ser. No. 12/729,036, incorporated by reference above). Thus, operation 320 may generally include conducting various passive vulnerability scans in the network, wherein information obtained in the passive vulnerability scans may then be forwarded to the management console for further analysis.

In one implementation, as noted above, the method 300 may further include operation 330, wherein operation 330 may include the log correlation engine aggregating various event logs generated across the network. For example, operation 330 may generally include the log correlation engine receiving one or more logs describing the network sessions and other traffic observed by the passive vulnerability scanners in operation 320, including time stamps describing when the network sessions started, durations that the sessions lasted, source and destination addresses associated with the sessions, and amounts of data communicated during the sessions. In one implementation, the log correlation engine may then parse the logs reported from the passive vulnerability scanner in addition to any logs reported from firewalls, routers, servers, devices, operating systems, web browsers, applications, intrusion detection systems, authentication systems, honeypots, DHCP sources, arpwatch sources, or other security monitoring systems (e.g., a particular arpwatch log may describe pairings between IP addresses and MAC addresses in the network and time stamps that describe when the pairings first appeared in the network). Thus, the log correlation engine may discover new or changed information describing network addresses, devices, or services active in the network.

In one implementation, operation 330 may further include the log correlation engine normalizing and analyzing the event logs to discover new or changed information describing devices, services, and other activity in the network and generate alerts in response to detecting the new or changed information. For example, the different sources that provide the event logs may include APACHE™ servers that generate APACHE™ events, Internet Information Services (IIS) systems that generate IIS events, authentication servers that generate successful and unsuccessful login and/or logout events, or various other sources that generate certain types of events. In addition, the different sources may further include routers, switches, or other network devices that generate Transmission Control Protocol (TCP) deny events, Internet Control Message Protocol (ICMP) ping events, snort or other intrusion detection system (IDS) events, and agents running in the network that generate certain types of events. In one implementation, operation 330 may therefore include the log correlation engine receiving event logs from various different sources in the network, normalizing the event logs to account for different transport mechanisms or formats that the sources may use for the event logs, and then analyzing the normalized logs to identify any new or changed information describing the routers, servers, hosts, devices, or services in the network. In one implementation, the information obtained from aggregating and analyzing the event logs in operation 330 may then be forwarded to the management console for further analysis.

For example, in one implementation, the management console may receive the information obtained by the active vulnerability scanners, the passive vulnerability scanners, and the log correlation engine in operations 310, 320, and 330, wherein an operation 340 may then include the management console building a topology or model of the network from such information. In particular, the model or topology built in operation 340 may include characteristics describing the various devices and services discovered in the network during operations 310, 320, and 330, including relationships between the various devices and services discovered in the network. Furthermore, in one implementation, the model or topology may be automatically updated in operation 340 in response to new or changed information discovered in subsequent active vulnerability scans, subsequently observed network traffic, or subsequently analyzed event logs. Additionally, in one implementation, the management console may accept various other types of input data to create charts, graphs, and other visualizations relating to the network model or topology (e.g., a client device may provide custom input data to the management console). In particular, the management console may generally accept any suitable input data that can be broken down into numbers, text, dates, times, or other information that may relate to data included in the network model or topology. As such, in addition to including the relationships between the various devices and services discovered in the network, the network model or topology built in operation 340 may further include relationships between the various devices and services discovered in the network and the numbers, text, dates, times, or other information obtained from the custom input data. In one implementation, in response to suitably building the topology of the network, the management console may then analyze the topology to identify various vulnerabilities in the network in an operation 350.

Additionally, in one implementation, the management console may provide capabilities to search and query the topology or model of the network, whereby an operation 355 may include determining whether such a search request or query has been received at the management console. As such, in one implementation, in response to receiving a search request or query at the management console in operation 355, the management console may then filter the network topology and vulnerabilities in an operation 360. For example, in one implementation, operation 355 may include the management console receiving a request to search the network topology for any unpatched Windows IIS servers for different political organizations. In response to such a search request, operation 360 would include filtering the network topology and vulnerabilities to identify a subset of the devices in the topology that correspond to Windows IIS servers owned or operated by one or more of the political organizations, and further identifying a subset of the Windows IIS servers owned or operated by one or more of the political organizations that have not applied a particular patch. Furthermore, in one implementation, operation 355 may support multiple simultaneous or comparative search requests or queries, wherein operation 360 may analyze the multiple search requests or queries substantially simultaneously to determine differences between filtering the topology and vulnerabilities based on criteria in the multiple search requests or queries. For example, a particular search request may include a query for all vulnerability data about email servers deployed in data centers at different geographic locations, wherein operation 360 would then include determining visual differences in the email server topologies deployed in the different geographic locations, relationships between ports and network addresses associated with the different email server topologies, and relationships between vulnerabilities and the network addresses associated with the different email server topologies. In one implementation, operation 355 may further support pre-defined and/or default search requests or queries. As such, operation 360 may further include filtering the network topology and vulnerabilities based on the pre-defined and/or default search requests or queries and/or saving any suitable search request or query to be used in subsequent operations 355 and 360.

Thus, operations 355 and 360 may generally support any suitable query of the topology built in operation 340 and the vulnerabilities identified in operation 350 (e.g., queries for certain vulnerability families, port ranges, discovery dates, etc.). In one implementation, in response to filtering the network topology and vulnerabilities in operation 360, the management console may then execute a three-dimensional visualization tool in an operation 370 to create a three-dimensional visualization of the filtered topology and/or vulnerabilities. For example, operation 360 may include the management console collecting, filtering, and organizing the data obtained from the active vulnerability scanners, the passive vulnerability scanners, and the log correlation engine and then running any queries received in operation 355 against such data, while operation 370 may include the three-dimensional visualization tool communicating with the management console over the network to request results of the queries that provide source material for creating three-dimensional charts, graphs, and other visualizations. Alternatively, in response to determining that no search request or query has been received in operation 355, operation 370 may include the management console executing the three-dimensional visualization tool to create a three-dimensional visualization of the unfiltered topology built in operation 340 and/or the unfiltered vulnerabilities identified in operation 350. In such instances, the three-dimensional visualization tool may similarly communicate with the management console to obtain the data describing the network, which may provide the source material for creating the three-dimensional charts, graphs, and other visualizations. For example, in one implementation, the three-dimensional visualization created in operation 370 may place every routing node to be displayed in the visualization on a helical or cylindrical spiral, and may further place hosts that communicate with the routing nodes in leaf nodes linked to the routing nodes nearest to the respective hosts (i.e., the leaf nodes may be linked to the nearest routing nodes in vectors directed outward from the helical or cylindrical spiral). Thus, placing the routing nodes in the helical or cylindrical spiral and then placing all leaf nodes in outward vectors that connect to the routing nodes in the helical or cylindrical spiral may enable the three-dimensional visualization to display large numbers of nodes (e.g., hundreds, thousands, or more nodes) simultaneously.

Figure 5A:
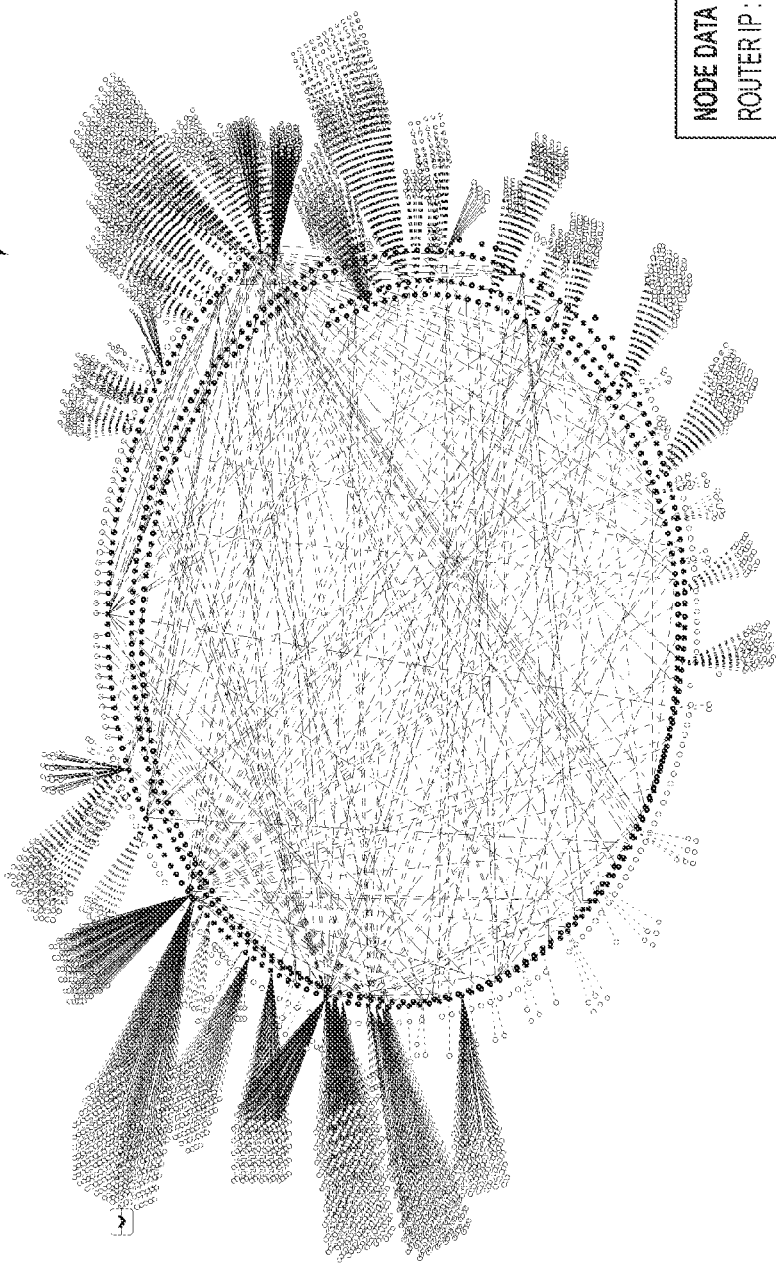
Figure 5B:
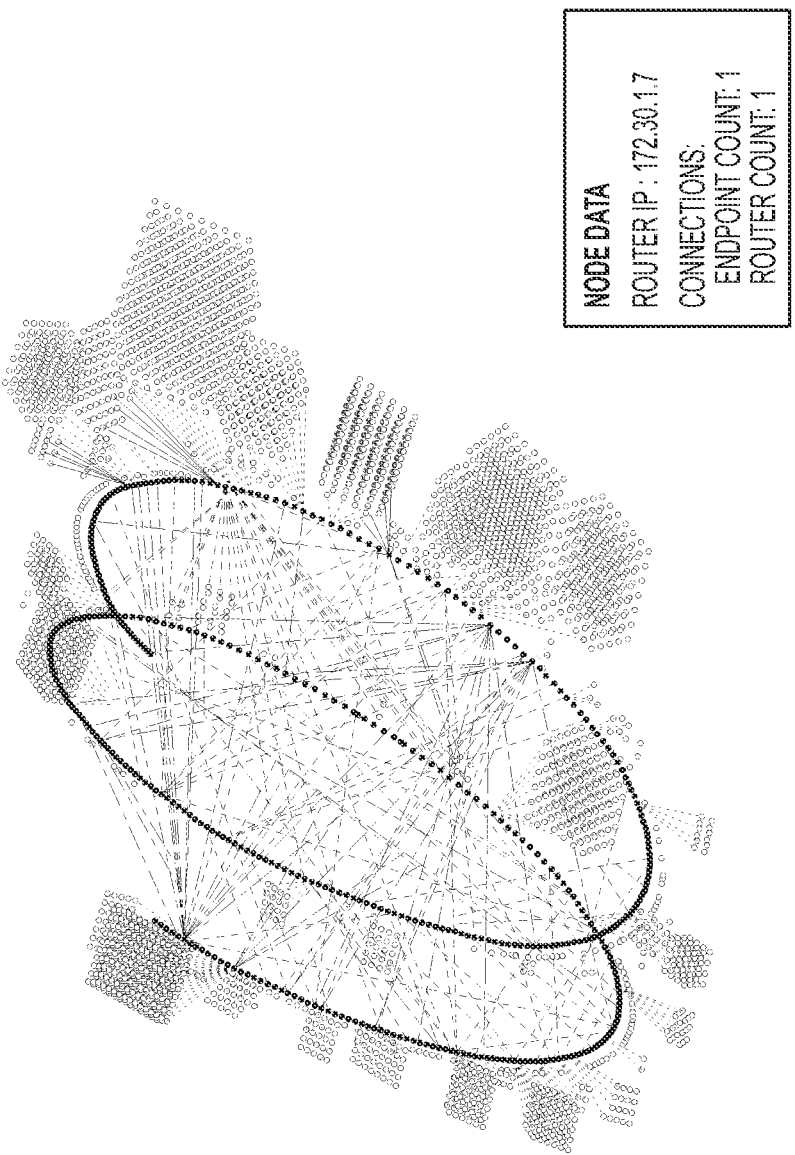
Figure 5D:
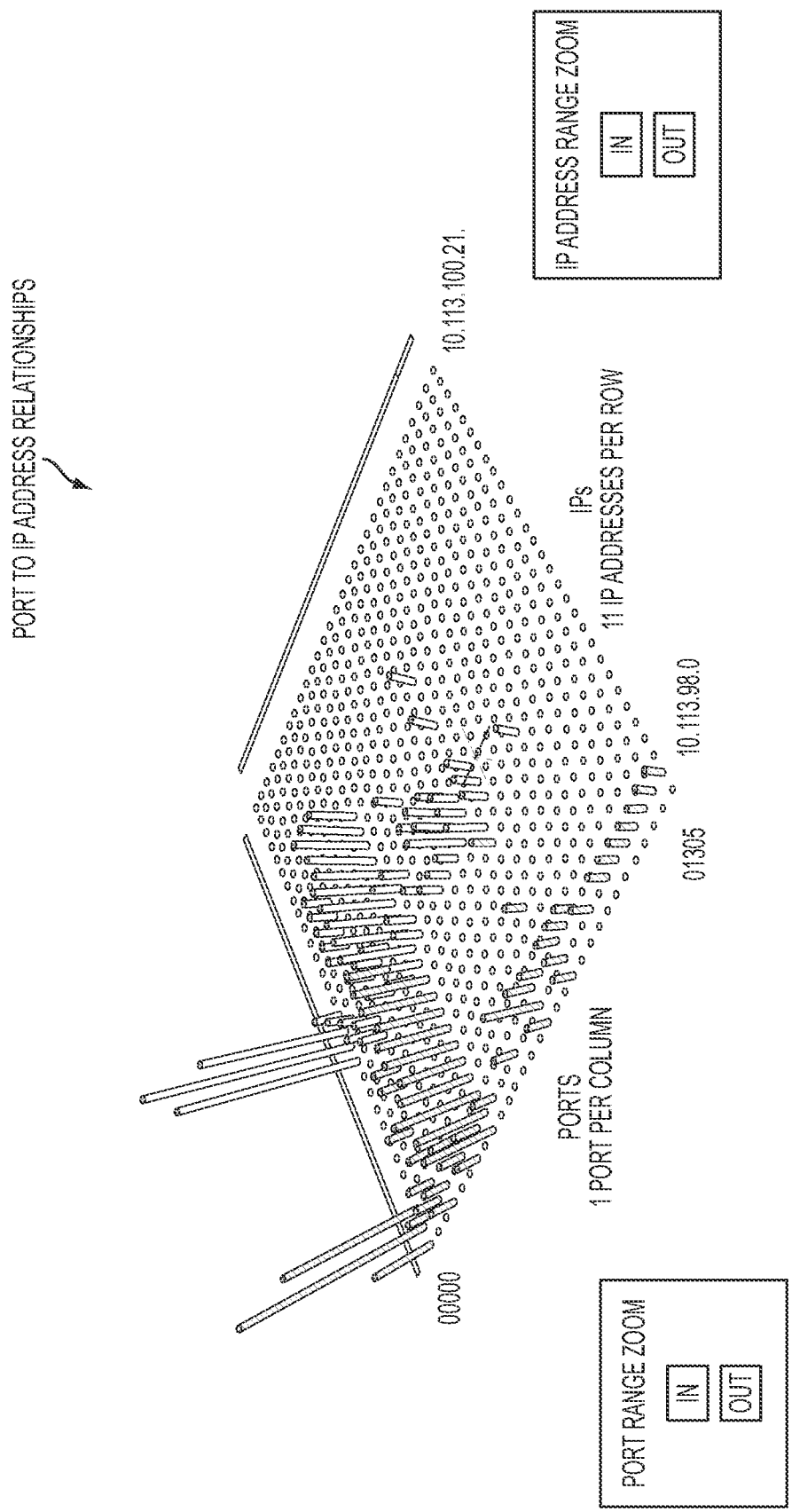
Figure 5E:
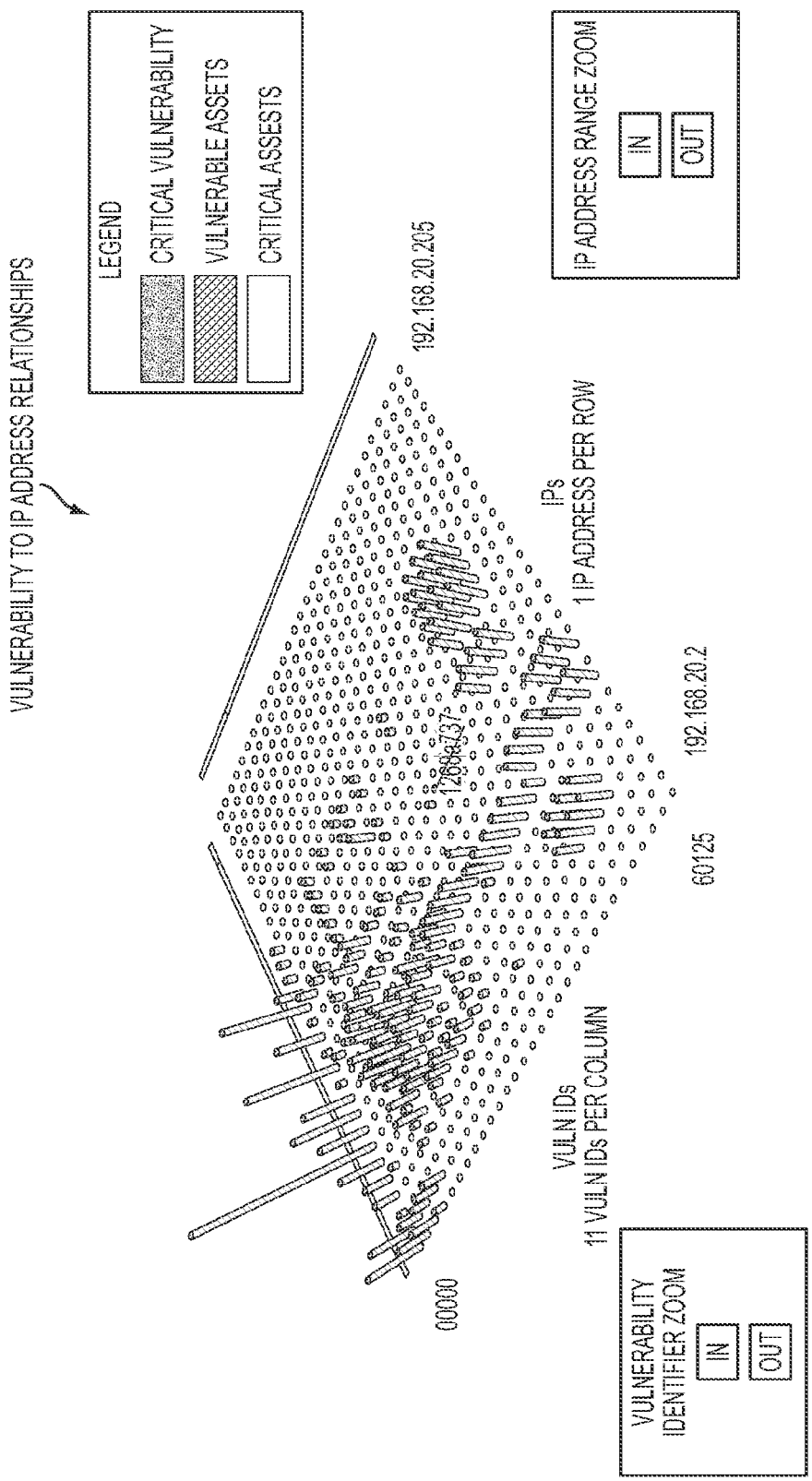

For example, FIG. 5A illustrates an exemplary screenshot of the three-dimensional visualization that may be produced in operation 370. In particular, FIG. 5A shows the network topology with routing nodes placed on the dotted helical spiral, with various leaf nodes connected to the dotted helical spiral in outward vectors. Thus, the three-dimensional visualization shown in FIG. 5A may represent a substantial number of routing nodes and hosts that connect to the routing nodes in a manner that visualizes the layout of the network topology (e.g., certain routing nodes have a large number of connected leaf nodes, thereby denoting "common" or core routing nodes, whereas other routing nodes having fewer connected leaf nodes may be considered less common or less important to functionality of the network). In another example, FIG. 5D illustrates a three-dimensional visualization of describing relationships between ports and Internet Protocol (IP) addresses in the network (i.e., one horizontal axis includes ports within a first range and the other horizontal axis includes IP addresses within a second range, while the vertical axis visualizes a number of each port in the first range associated with each IP address in the second range). In yet another example, FIG. 5E illustrates a three-dimensional visualization of describing relationships between vulnerabilities and IP addresses in the network (i.e., one horizontal axis includes vulnerabilities having identifiers within a first range and the other horizontal axis includes IP addresses within a second range, while the vertical axis visualizes a number of each vulnerability identifier in the first range associated with each IP address in the second range). Thus, the three-dimensional visualization generated in operation 370 may provide various different ways to visualize data relating to vulnerabilities and assets in the network.

In one implementation, an operation 380 may include the management console further applying one or more visual effects to the three-dimensional visualization created in operation 370. In particular, applying the visual effects to the three-dimensional visualization in operation 380 may include assigning one or more color codes to various elements in the three-dimensional visualization, wherein the color codes may represent values or other properties for assets, vulnerabilities, or other elements in the three-dimensional visualization. For example, the exemplary three-dimensional visualization shown in FIG. 5E may include a red color code to represent critical vulnerabilities associated with IP addresses in the range "192.168.20.2" to "192.168.20.205," an orange color code to represent vulnerable assets in the IP address range "192.168.20.2" to "192.168.20.205," and a yellow color code to represent critical assets in the IP address range "192.168.20.2" to "192.168.20.205." Additionally, various similar, different, additional, or other color codes may be applied to the three-dimensional visualization created in operation 370 to represent any suitable properties associated with the elements of the network visualized therein.

Furthermore, in one implementation, operation 380 may further include applying one or more rotations, mirroring effects, camera animations, or other visual effects to the three-dimensional visualization, wherein the rotations, mirroring effects, camera animations, or other visual effects may enable different views for the three-dimensional visualization. For example, FIG. 5B illustrates an exemplary three-dimensional visualization that applies a rotation visual effect to the network topology shown in FIG. 5A, whereby FIG. 5B rotates the network topology shown in FIG. 5A about the vertical axis to provide a different visualization of the routing topology shown therein (i.e., rotating the routing topology about the vertical axis to visualize location-based relationships between the routing nodes and leaf nodes connected to the helical or cylindrical spiral). In another example, FIG. 5C illustrates an exemplary three-dimensional visualization that applies a mirroring visual effect to a three-dimensional routing topology in the network, whereby FIG. 5C displays the routing topology with various routing nodes and leaf nodes connected to a helical or cylindrical spiral in addition to a mirrored view that represents a reflection of the routing topology (i.e., reflecting the routing topology to visualize location-based relationships between the routing nodes and the leaf nodes connected to the helical or cylindrical spiral). In still another example, where the three-dimensional visualization includes temporal data associated with the nodes or other data points displayed therein, the visual effects may include VCR-style playback controls that can be used to present changes that occur in the three-dimensional visualization over time (e.g., to show changes in traffic distribution, worm outbreaks, vulnerability remediation processes, or other information relating to the network that may change over time or otherwise have temporal data associated therewith). Thus, the visual effects applied to the three-dimensional visualization in operation 380 may provide various different ways to visualize the vulnerability and asset data represented in the three-dimensional visualization created in operation 370.

Additionally, in one implementation, the management console and the three-dimensional visualization tool may create multiple three-dimensional visualizations in operation 370, wherein the multiple three-dimensional visualizations may be simultaneously hosted within one three-dimensional space. Thus, creating multiple three-dimensional visualizations in operation 370 may enhance an ability of the management console and the three-dimensional visualization tool to associate data points in the network model or topology in various ways. For example, in one implementation, the multiple three-dimensional visualizations may include a primary three-dimensional visualization (e.g., the network topology), wherein the primary three-dimensional visualization may be supplemented with one or more additional graphs, charts, or other visualizations that relate to the primary three-dimensional visualization. Furthermore, in one implementation, the visual effects applied in operation 380 may describe the relationships between the primary three-dimensional visualization and the supplementary visualizations and/or interactions with nodes or other data points in the primary or supplementary visualizations. For example, the relationships between or interactions with the nodes or other data points in the primary and supplementary visualizations may be represented with connecting lines, highlighted shared colors, modified node colors, or animations causing one or more of the nodes or other data points to have a pulsing size, throbbing color, or other visually perceptible trait.

In one implementation, to display the three-dimensional visualizations created in operation 370 (with or without any visual effects that may have been applied in operation 380), the management console may operate on a web server and generate a user interface that can present the three-dimensional visualizations and/or any visual effects applied thereto within a web browser. Alternatively, in one implementation, the management console may provide a specialized application that can present the three-dimensional visualizations and/or the visual effects applied thereto. In particular, performance constraints associated with any hardware and/or software that the management console or client devices use to present the three-dimensional visualizations may interfere with suitably presenting the substantial data quantities typically included therein. As such, in one implementation, the specialized application may be designed in view of the performance constraints typically associated with presenting the substantial data quantities typically included in the three-dimensional visualizations. For example, in one implementation, the management console may execute the specialized application and remotely present the three-dimensional visualizations to a client device. Alternatively, in one implementation, a client device may download the specialized application and any data needed to present the three-dimensional visualizations from the management console, wherein the client device may then locally execute the specialized application to locally present the three-dimensional visualizations.

Figure 4:
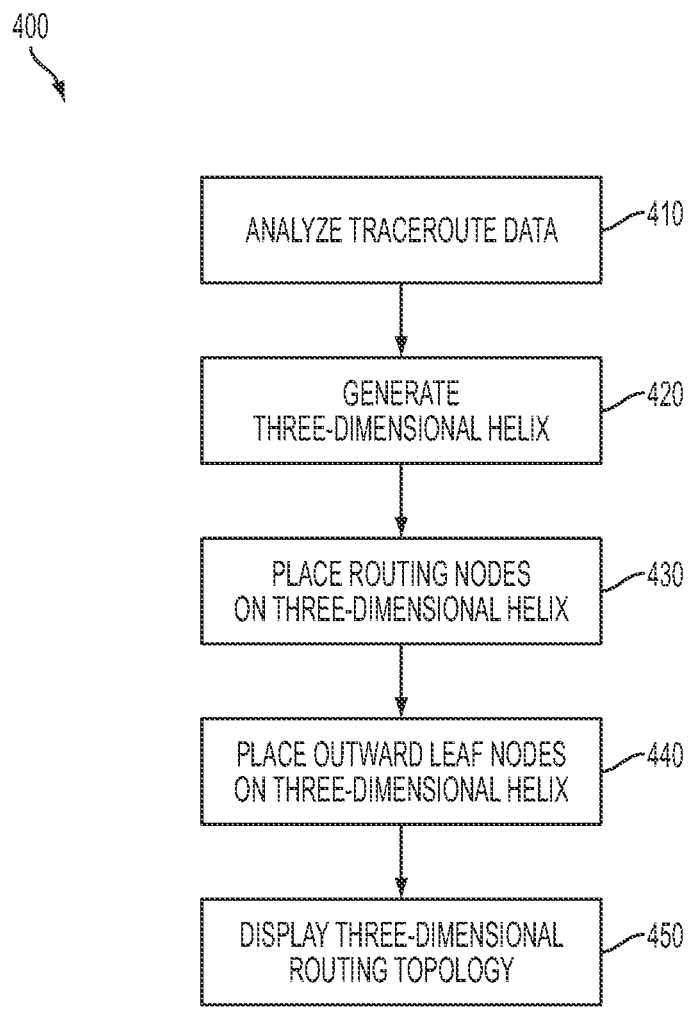
FIG. 4 illustrates another flowchart of the method for three-dimensional visualization of vulnerability and asset data, according to one aspect of the invention.

According to one aspect of the invention, FIG. 4 illustrates another flowchart of the method 400 for three-dimensional visualization of vulnerability and asset data. In one implementation, the method 400 shown in FIG. 4 and described herein may generally provide substantially similar functionality to the method 300 shown in FIG. 3 and described above. In particular, the method 400 may include one or more active vulnerability scanners conducting one or more active scans in a network, one or more passive vulnerability scanners passively observing traffic traveling in the network, and a log correlation engine aggregating one or more logs containing events describing activity that occurs in the network. Thus, the method 400 may generally include the active vulnerability scanners, the passive vulnerability scanners, and the log correlation engine obtaining data describing various vulnerabilities and assets discovered in the network, and may further include the active vulnerability scanners, the passive vulnerability scanners, and the log correlation engine obtaining data describing various relationships between the vulnerabilities and the assets discovered in the network. In one implementation, the data describing the vulnerabilities, assets, and relationships discovered in the network may then be provided to a management console, which may include a three-dimensional visualization tool that can create three-dimensional visualizations representing the vulnerabilities, assets, and relationships discovered in the network (e.g., the three-dimensional visualizations may represent routing topologies or other topologies in the network, trust relationships discovered in the network, security events detected in the network, etc.).

In one implementation, the data describing the vulnerabilities, assets, and relationships discovered in the network may include "traceroute" data, which may generally represent various routes that packets take when traveling across or within the network (e.g., various hosts in the network that the packets traversed in transit to a particular destination). As such, in one implementation, an operation 410 may include the management console analyzing any traceroute data collected by one or more of the active vulnerability scanners, the passive vulnerability scanners, and the log correlation engine to discover assets or other hosts in the network that various packets traversed in routes to respective destinations for the packets. For example, analyzing the traceroute data in operation 410 may include discovering connections or other relationships between various routers, hosts, devices, and other assets in the network, wherein the discovered connections or other relationships may then be used to common "routers" (e.g., routers, hosts, devices, and other assets that packets commonly or frequently traverse in the routes to the various destinations). In other examples, the traceroute data may be analyzed in operation 410 to discover trust relationships between the various assets discovered in the network, ICMP flood activity in the network, correlations between source ports and destination ports involved in the traffic observed in the network, or various other relationships between the vulnerabilities and assets discovered in the network.

In one implementation, the active vulnerability scanners, the passive vulnerability scanners, and the log correlation engine may generate one or more comma separated variable (CSV) files that contain the information obtained from conducting the active scans in the network, observing the traffic traveling across and within the network, and analyzing the event logs that describe the activity that occurs in the network. The one or more CSV files may then be exported to the management console, which may then parse, normalize, and otherwise sanitize the information represented in the CSV files (e.g., replacing certain live IP addresses with normalized data). For example, in one implementation, the management console may include one or more AfterGlow scripts or other executable modules that can derive relationships between various entries in a complex dataset and generate visualizations that graphically represent the derived relationships (e.g., linked network graphs, treemaps, etc.). As such, in one implementation, the management console may sanitize the CSV files to convert the information represented therein into a format that the AfterGlow scripts or other executable modules can consume. For example, in one implementation, the management console may execute the following PERL script to convert the CSV files into the formation that the AfterGlow scripts or other executable modules can consume:

```
#!/usr/bin/perl
open (FH, "source.csv");
open (WH, >afterglow.csv);
$line = <FH>;
while (<FH>)
    {
    $line = $_;
    #$line = ~s/xxx/yyy/g;
    @stuff = split (",", $line);
    Print WH ("$stuff[2], $stuff[3]\n");
    }
close (FH); close (WH);
```

Thus, the PERL script provided above may generally receive an input file named "source.csv" and create an output file named "afterglow.csv." For example, in the example provided above relating to analyzing the traceroute data to discover trust relationships between various assets discovered in the network, the input file may include one or more entries that represent the passive vulnerability scanners detecting that a certain host has connected to another host one or more times. In particular, in response to the passive vulnerability scanners newly detecting the connection between the hosts, the passive vulnerability scanners may create the following report:

192.168.20.199|unknown (22/tcp)|3|Security Note|192.168.20.199→192.168.20.200:22

Thus, based on the report indicating that a host with the IP address 192.168.20.199 connected to port 22 on a host with the IP address 192.168.20.200, one line in the "afterglow.csv" output file may have the source IP address 192.168.20.199 and the destination IP address 192.168.20.200, which may be separated with a comma, and may further have the destination port 22, which may be separated with another comma. Further, on the comment line in the PERL script provided above, the "xxx" and "yyy" text could be replaced with various octets to obscure certain IP address ranges in the network (e.g., to replace all IP addresses that start with "10.10" with "20.20," the comment line in the PERL script could be changed to:

$line=!s/^10\.10\./20.20/g;

Accordingly, in one implementation, the traceroute data analyzed in operation 410 may generally include various CSV files that represent vulnerabilities, assets, activity, events, and other information describing an operational state for the network in a normalized format. Thus, the management console may provide the normalized traceroute data to the Afterglow scripts or other executable modules, which may then derive various relationships from the normalized data and generate one or more visualizations that graphically represent the derived relationships. Furthermore, analyzing the normalized traceroute data in operation 410 may include filtering the normalized traceroute data based on various search requests or queries (e.g., as described above in connection with FIG. 3), wherein the filtered traceroute data may be further formatted into one or more CSV files that includes appropriate access controls (e.g., in response to receiving a query from an entity only having access to systems in a certain location, the output CSV files may only include vulnerabilities, assets, compliance data, and other data from the systems in that location). For example, in one implementation, the filtered traceroute data may include a subset of the vulnerabilities and assets that have certain properties (e.g., particular open ports, software installations, document hosting locations, vulnerabilities, devices that have vulnerabilities older than a certain time period, components in demilitarized zones or protected networks that accept connections from remote networks, devices that lack administrator credentials, servers that have configurations that do not comply with certain policies, etc.). Similarly, the output CSV file may contain various events that describe activity in the network with certain properties (e.g., events that relate to creating or deleting users, accessing audited objects, changing passwords, changes in the network, user login attempts, times that certain activity occurs in the network, statistical deviations or anomalies, intrusions or compromises in the network, never before seen events, etc.)

In one implementation, in response to suitably analyzing the traceroute data and generating the visualizations that graphically represent the relationships derived from the analyzed traceroute data, an operation 420 may create a three-dimensional visualization representing a routing topology in the network. For example, the three-dimensional routing topology created in operation 420 may include generating a three-dimensional helix or cylindrical spiral that represents every node that the packets traversed in the network along routes to respective destinations for the packets. In one implementation, an operation 430 may then include placing every routing node that the packets traversed directly on the helix, while a subsequent operation 440 may include representing the respective destinations for the packets with leaf nodes that connect to the routing nodes placed on the helix. In particular, operation 440 may place the leaf nodes representing the destinations for the packets in outward vectors that connect to the routing nodes placed directly on the helix. Furthermore, in one implementation, in response to determining that one or more leaf nodes connect to a plurality of the routing nodes, operation 440 may connect such leaf nodes to the nearest one of the plurality routing nodes (e.g., based on geographic proximities, routing proximities, etc.). In one implementation, an operation 450 may then include display the three-dimensional routing topology, including the three-dimensional helix, the routing nodes placed directly on the helix, and the leaf nodes connected to the routing nodes in the outward vectors. For example, as shown in FIG. 5A, FIG. 5B, and FIG. 5C, the three-dimensional helix may be represented with a dotted line, the routing nodes may be represented with visual elements or other objects placed directly on the helix, and the leaf nodes may be represented with visual elements or other objects that connect in outward vectors to the routing nodes placed directly on the helix.

In one implementation, the three-dimensional visualizations that represent the routing topologies may therefore show the routing nodes that the packets traversed in the routes to the respective destinations in a manner that can substantially simplify managing the routing topology in the network (e.g., showing which routers have the most leaf nodes and therefore represent commonly used routing nodes, showing how the routing nodes connect to the leaf nodes and to one another, etc.). In particular, whereas "hub and spoke" and other two dimensional topology visualizations tend to have limitations in the number of nodes that can be displayed simultaneously without unduly crowding or otherwise obscuring the relationships between elements displayed therein, placing the routing nodes directly on the three-dimensional helix and linking the leaf nodes that represent the hosts, endpoints, or other destinations connected to the routing nodes in outward vectors from the helix may enable the three-dimensional visualization to simultaneously display the same information in a manner that substantially simplifies managing the network without crowding or otherwise obscuring the relationships displayed therein. The three-dimensional routing topology displayed in operation 450 may therefore provide information that can visually aid techniques used to scan or other discover information describing a state of the network. In particular, as noted above, a combination of one or more active vulnerability scanners, one or more passive vulnerability scanners, and a log correlation engine may be used to obtain the information describing the state of the network (e.g., conducting one or more active scans in the network, passively observing traffic traveling across and within the network, analyzing event logs describing activity in the network, etc.).

Thus, in one implementation, an administrator or other suitable user may view the three-dimensional routing topology to identify commonly used routing nodes, dead space, choke points, or other topological features of the network, wherein the administrator or other user may then configure one or more of the active vulnerability scanners, the passive vulnerability scanners, or the log correlation engine to optimize the techniques used to discover the information describing the state of the network. In particular, the commonly used routing nodes, dead space, choke points, or other topological features of the network may be used to reduce an amount of time required to obtain the information describing the state of the network or otherwise optimize the techniques that active vulnerability scanners, the passive vulnerability scanners, and the log correlation engine use to obtain such information. In particular, in one implementation, the three-dimensional routing topology displayed in operation 450 may be referenced to determine an appropriate balance between speeds, thoroughness, and invasiveness associated with scanning the network. For example, because the active vulnerability scanners generally communicate packets or other messages within the network during the active scans, the active vulnerability scanners may introduce additional traffic that can burden the network, especially where normal traffic in the network may be heavy. Similarly, because the passive vulnerability scanners generally depend upon existing traffic in the network, the passive vulnerability scanners may be underutilized when deployed in locations that do not experience significant traffic volumes, while resources associated with the log correlation engine may become taxed where a substantial number of analyzed logs contain events that have relatively little importance to managing the vulnerabilities and assets in the network.

Accordingly, in one implementation, the three-dimensional routing topology displayed in operation 450 may be referenced to avoid certain scanning or analysis activity that likely will not produce information having importance to managing the vulnerabilities and assets in the network. For example, rather than having the active vulnerability scanners probe every possible port in the network, the three-dimensional routing topology may be referenced (or filtered) to identify a subset of the ports involved in a substantial amount of activity that actually occurs in the network (e.g., based on information that the passive vulnerability scanners discover describing ports that were opened, browsed, or otherwise involved in the actual network activity). In another example, the three-dimensional routing topology may be referenced (or filtered) to identify address spaces in the network involved in relatively little or no activity (e.g., routing nodes on the helix that fall within certain address spaces may have no leaf nodes connected thereto, whereby the active vulnerability scanners may be configured to avoid scanning such address spaces). Nonetheless, one or more of the passive vulnerability scanners may be deployed in a location to passively observe traffic in such address spaces, whereby in response to the passive vulnerability scanners subsequently observing activity that occurs therein, the active vulnerability scanners may conducting an active scan to discover vulnerabilities and assets associated therewith. Alternatively (or additionally), the management console may create one or more dynamic asset lists representing every available host, whereby a chained scan can then be conducted to only probe hosts in the dynamic asset lists that have certain types, ages, operating systems, or other parameters, and moreover, the management console may create one or more static asset lists that a switching infrastructure can periodically query to discover IP addresses or other assets that have become active in the network.

Furthermore, another analysis that can be visually aided with the three-dimensional routing topology may include identifying choke points that slow active scans conducted in the network. For example, the three-dimensional routing topology may be referenced (or filtered) to determine whether the packets or other messages sent throughout the network during the active scans traverse certain switches, virtual local area networks, routers, firewalls, proxy devices, wireless gateways, or other elements in the routing topology. Thus, identifying certain elements in the routing topology that the packets or other messages traverse during the active scans may identify choke points that can provide bottlenecks or otherwise reduce performance in the network during the active scans, whereby strategically relocating one or more active vulnerability scanners from outside to inside the choke points may substantially reduce or avoid the bottlenecks caused by communicating the packets or messages through the choke points during the active scans. In another example, the active vulnerability scanners may record an amount of time to complete a scan for any suitable host in the network, whereby the routing topology may be referenced (or filtered) to identify hosts to avoid actively scanning because such hosts may be associated with scan times that exceed a certain threshold (e.g., creating a dynamic asset list representing the hosts with scan times that exceed the threshold and excluding the hosts in the dynamic asset list from the active scans).

Thus, the three-dimensional routing topology may be referenced (or filtered) in various ways to derive information about the network that can then be used to balance speeds, thoroughness, and invasiveness associated with scanning the network and further to optimize performance in the network. For example, the three-dimensional routing topology may visually represent various hosts, routing nodes, or other systems within a particular address space or subnet that represents a choke point in the network, whereby additional routing nodes, switches, or other infrastructure may be deployed at the choke point to reduce bottlenecks that may occur therein. In another example, assets associated with the scan times that exceed the threshold may be analyzed for common parameters or other criteria (e.g., processor speeds, memory, system firewalls, vulnerabilities, etc.), which may be compared to other assets having faster scan times to determine whether the parameters common to the assets having the longer scan times may be causing the longer scan times. In this example, a first query may be provided to the management console to filter the topology for a target network and a second query may be provided to filter the topology for the hosts that have the longer scan times, whereby different three-dimensional visualizations created in response to the first query and the second query can be visually compared to identify open ports, vulnerabilities, or other criteria that may be causing the longer scan times. Furthermore, although certain exemplary queries and network management techniques have been described herein, any other suitable queries or network management techniques may be applied using the three-dimensional visualizations that can be created with the systems and methods described herein, whether or not explicitly described.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A computer system for three-dimensional visualization of vulnerability and asset data, comprising:
  one or more active vulnerability scanners configured to
    conduct one or more active scans in a network, wherein the active vulnerability scanners interrogate a plurality of hosts in the network during the one or more active scans conducted in the network;

one or more passive vulnerability scanners configured to passively observe traffic traveling in the network, wherein the passive vulnerability scanners reconstruct one or more sessions involving one or more of the plurality of hosts from the passively observed traffic;

a log correlation engine configured to correlate a plurality of events contained in one or more logs that describe activity detected in the network;

a management console comprising one or more physical processors configured to:

collect information obtained from the active vulnerability scanners interrogating the plurality of hosts, the passive vulnerability scanners reconstructing the one or more sessions, and the log correlation engine correlating the plurality of events;

build a model of the network with the information collected from the active vulnerability scanners, the passive vulnerability scanners, and the log correlation engine, wherein the model of the network includes the plurality of hosts and a plurality of potential vulnerabilities associated with the plurality of hosts; and display a three-dimensional visualization that graphically represents the model of the network, wherein the three-dimensional visualization includes one or more relationships between the plurality of hosts and the plurality of potential vulnerabilities and a routing topology with one or more routing nodes that represent one or more hosts traversed by the traffic and one or more leaf nodes that represent destinations for the traffic.

2. The system of claim 1, wherein the collected information includes traceroute data describing the one or more of the plurality of hosts that the traffic traverses and one or more of the plurality of hosts that represent the destinations for the traffic.

3. The system of claim 1, wherein the routing topology includes a cylindrical helix having the routing nodes placed directly thereon and further having the leaf nodes connected to the routing nodes on vectors directed outward from the cylindrical helix.

4. The system of claim 1, the management console further configured to apply a mirroring visual effect to the three-dimensional visualization, wherein the mirroring visual effect reflects the graphically represented network model within the three-dimensional visualization.

5. The system of claim 4, the management console further configured to apply a rotation visual effect to the three-dimensional visualization, wherein the mirroring visual effect rotates the graphically represented network model about one axis of the three-dimensional visualization.

6. The system of claim 2, wherein the three-dimensional visualization graphically represents one or more of the routing nodes in the network model commonly traversed by the traffic, dead space in the network model that the traffic does not traverse, and choke points that represent bottlenecks in the network model.

7. The system of claim 6, the management console further configured to modify functionality for one or more of the active vulnerability scanners, the passive vulnerability scanners, or the log correlation engine based on one or more of the commonly traversed routing nodes, the dead space, or the choke points in the network model.

8. The system of claim 1, the management console further configured to display one or more playback controls that present temporal changes to the three-dimensional visualization that occur over time in response to one or more interactions with the playback controls.

9. The system of claim 1, the management console further configured to apply one or more color codes to the three-dimensional visualization, wherein the color codes represent values associated with one or more of the plurality of hosts, the plurality of potential vulnerabilities, or the one or more relationships between the plurality of hosts and the plurality of potential vulnerabilities.

10. The system of claim 1, the management console further configured to filter the model of the network in response to a query that includes one or more criteria, wherein the one or more relationships graphically represented in the three-dimensional visualization match the criteria provided in the query.

11. The system of claim 1, the management console further configured to receive custom input data from a client device in communication with the management console, wherein the management console further builds the model of the network with the custom input data received from the client device.

12. The system of claim 1, the management console further configured to display the three-dimensional visualization with one or more supplementary visualizations within one three-dimensional space, wherein the three-dimensional space further includes one or more relationships between one or more data points in the three-dimensional visualization and one or more data points in the one or more supplementary visualizations.

13. A method for three-dimensional visualization of vulnerability and asset data, the method being implemented in a computer system comprising one or more physical processors, the method comprising:

conducting, by the computer system, one or more active scans in a network, wherein one or more active vulnerability scanners interrogate a plurality of hosts in the network during the one or more active scans conducted in the network;

passively observing, by the computer system, traffic traveling in the network, wherein one or more passive vulnerability scanners reconstruct one or more sessions involving one or more of the plurality of hosts from the passively observed traffic;

correlating, by the computer system, a plurality of events contained in one or more logs that describe activity detected in the network, wherein a log correlation engine correlates the plurality of events that describe the activity detected in the network;

building, by the computer system, a model of the network with information collected from the active vulnerability scanners interrogating the plurality of hosts, at least one of the one or more passive vulnerability scanners reconstructing the one or more sessions, and the log correlation engine correlating the plurality of events, wherein the model of the network includes the plurality of hosts and a plurality of potential vulnerabilities associated with the plurality of hosts; and displaying, by the computer system, a three-dimensional visualization that graphically represents the model of the network, wherein the three-dimensional visualization includes one or more relationships between the plurality of hosts and the plurality of potential vulnerabilities and a routing topology with one or more routing nodes that represent one or more hosts traversed by the traffic and one or more leaf nodes that represent destinations for the traffic.

14. The method of claim 13, wherein the collected information includes traceroute data describing the one or more of the plurality of hosts that the traffic traverses and one or more of the plurality of hosts that represent the destinations for the traffic.

15. The method of claim 13, wherein the routing topology includes a cylindrical helix having the routing nodes placed directly thereon and further having the leaf nodes connected to the routing nodes on vectors directed outward from the cylindrical helix.

16. The method of claim 13, further comprising applying, by the computer system, a mirroring visual effect to the three-dimensional visualization, wherein the mirroring visual effect reflects the graphically represented network model within the three-dimensional visualization.

17. The method of claim 16, further comprising applying, by the computer system, a rotation visual effect to the three-dimensional visualization, wherein the mirroring visual effect rotates the graphically represented network model about one axis of the three-dimensional visualization.

18. The method of claim 14, wherein the three-dimensional visualization graphically represents one or more of the routing nodes in the network model commonly traversed by the traffic, dead space in the network model that the traffic does not traverse, and choke points that represent bottlenecks in the network model.

19. The method of claim 18, further comprising modifying, by the computer system, functionality for one or more of the active vulnerability scanners, the passive vulnerability scanners, or the log correlation engine based on one or more of the commonly traversed routing nodes, the dead space, or the choke points in the network model.

20. The method of claim 13, further comprising displaying, by the computer system, one or more playback controls that present temporal changes to the three-dimensional visualization that occur over time in response to one or more interactions with the playback controls.

21. The method of claim 13, further comprising applying, by the computer system, one or more color codes to the three-dimensional visualization, wherein the color codes represent values associated with one or more of the plurality of hosts, the plurality of potential vulnerabilities, or the one or more relationships between the plurality of hosts and the plurality of potential vulnerabilities.

22. The method of claim 13, further comprising filtering, by the computer system, the model of the network in response to a query that includes one or more criteria, wherein the one or more relationships graphically represented in the three-dimensional visualization match the criteria provided in the query.

23. The method of claim 13, further comprising receiving, by the computer system, custom input data from a client device, wherein the model of the network further includes the custom input data received from the client device.

24. The method of claim 13, further comprising displaying, by the computer system, the three-dimensional visualization with one or more supplementary visualizations within one three-dimensional space, wherein the three-dimensional space further includes one or more relationships between one or more data points in the three-dimensional visualization and one or more data points in the one or more supplementary visualizations.

25. A management console device, comprising:
one or more physical processors configured to:
collect information obtained from one or more active vulnerability scanners configured to interrogate a plurality of hosts in a network, from one or more passive vulnerability scanners configured to reconstruct one or more sessions from passively observed traffic in the network, and from a log correlation engine configured to correlate a plurality of events contained in one or more logs that describe activity detected in the network;
build a model of the network with the information collected from the active vulnerability scanners, the passive vulnerability scanners, and the log correlation engine, wherein the model of the network includes the plurality of hosts and a plurality of potential vulnerabilities associated with the plurality of hosts; and
display a three-dimensional visualization comprising a first dimension that conveys first data, a second dimension that conveys second data, and a third dimension that conveys third data, the first dimension, the second dimension and the third dimension graphically representing the model of the network, wherein the three-dimensional visualization includes one or more relationships between the plurality of hosts and the plurality of potential vulnerabilities and a routing topology with one or more routing nodes that represent one or more hosts traversed by the traffic and one or more leaf nodes that represent destinations for the traffic.

* * * * *